United States Patent
Trook

(10) Patent No.: US 9,350,441 B2
(45) Date of Patent: May 24, 2016

(54) RAPID DEPLOYMENT AIRBORNE REPEATER

(71) Applicant: Magneticomm, Inc., Lincoln, NE (US)

(72) Inventor: Gregory B. Trook, Lincoln, NE (US)

(73) Assignee: Magneticomm, Inc., Lincoln, NE (US)

( * ) Notice: Subject to any disclaimer, the term of this patent is extended or adjusted under 35 U.S.C. 154(b) by 0 days.

(21) Appl. No.: 14/411,607

(22) PCT Filed: Jun. 28, 2013

(86) PCT No.: PCT/US2013/048524
§ 371 (c)(1),
(2) Date: Dec. 29, 2014

(87) PCT Pub. No.: WO2014/004996
PCT Pub. Date: Jan. 3, 2014

(65) Prior Publication Data
US 2015/0162974 A1    Jun. 11, 2015

Related U.S. Application Data

(60) Provisional application No. 61/665,986, filed on Jun. 29, 2012.

(51) Int. Cl.
| | |
|---|---|
| *H04B 3/36* | (2006.01) |
| *H04B 1/00* | (2006.01) |
| *H04B 7/14* | (2006.01) |
| *H04B 7/155* | (2006.01) |
| *H04B 1/525* | (2015.01) |
| *H04B 1/44* | (2006.01) |

(52) U.S. Cl.
CPC ............. *H04B 7/15571* (2013.01); *H04B 1/44* (2013.01); *H04B 1/525* (2013.01); *H04B 7/155* (2013.01)

(58) Field of Classification Search
CPC .................................................. H04B 7/15571
USPC .......................... 455/11.1, 13.1; 370/316, 315
See application file for complete search history.

(56) References Cited

U.S. PATENT DOCUMENTS

2004/0032371 A1* 2/2004 Mendolia ............... H01Q 1/243
343/702
2004/0176027 A1* 9/2004 O'Neill .............. H04B 7/15535
455/7

(Continued)

OTHER PUBLICATIONS

Notification of Transmittal of the International Search Report and The Written Opinion of the International Searching Authority—Nov. 8, 2013.

*Primary Examiner* — Tilahun B Gesesse
(74) *Attorney, Agent, or Firm* — Tyson B. Benson; Advent, LLP

(57) ABSTRACT

A compact, portable repeater system is disclosed. In an implementation, the system includes a receiver configured to receive a first signal via an antenna during a first time interval, a transmitter configured to transmit a second signal via the antenna during a second time interval, and a communication isolator coupled to the transmitter and the receiver. The communication isolator is configured to communicatively isolate the transmitter from the receiver to allow the transmitter and the receiver to utilize the antenna. The transmitter, the receiver, and the receiver are enclosed within a vault. The communication isolator has a vertically stacked configuration for allowing the communication isolator to be enclosed within the vault. The portable repeater system is configured to be deployed at the same height as the antenna to at least substantially eliminate antenna transmission line signal losses.

14 Claims, 23 Drawing Sheets

(56) References Cited

U.S. PATENT DOCUMENTS

| | | | |
|---|---|---|---|
| 2005/0286448 A1* | 12/2005 | Proctor | H04B 7/15507 370/279 |
| 2008/0310093 A1 | 12/2008 | McEwan et al. | |
| 2009/0081943 A1 | 3/2009 | Dobyns et al. | |
| 2010/0080151 A1 | 4/2010 | Proctor et al. | |
| 2010/0165571 A1 | 7/2010 | Everhart et al. | |

\* cited by examiner

Standard Mobile Duplexer Cavity Array

Modified Mobile Duplexer Cavity Array

Single Cavity

RAPID DEPLOYMENT AIRBORNE REPEATER

BACKGROUND

Repeater devices are electronic devices configured to receive a signal and to retransmit the signal from a higher elevation and/or at a higher power level. For example, a repeater may be utilized to retransmit a signal to another side of an obstruction to allow the signal to reach longer distances.

SUMMARY

A compact, portable repeater system is disclosed. In an implementation, the system includes a receiver configured to receive a first signal via an antenna during a first time interval, a transmitter configured to transmit a second signal via the antenna during a second time interval, and a communication isolator coupled to the transmitter and the receiver. The communication isolator is configured to communicatively isolate the transmitter from the receiver to allow the transmitter and the receiver to utilize the same antenna. The transmitter and the receiver are enclosed within a protective case, or vault. The communication isolator has a vertically stacked configuration for allowing the communication isolator to be enclosed within the cylindrical vault. The portable repeater system is configured to be deployed at the same height as the antenna to at least substantially eliminate antenna transmission line signal losses.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Overview

Figure 1:
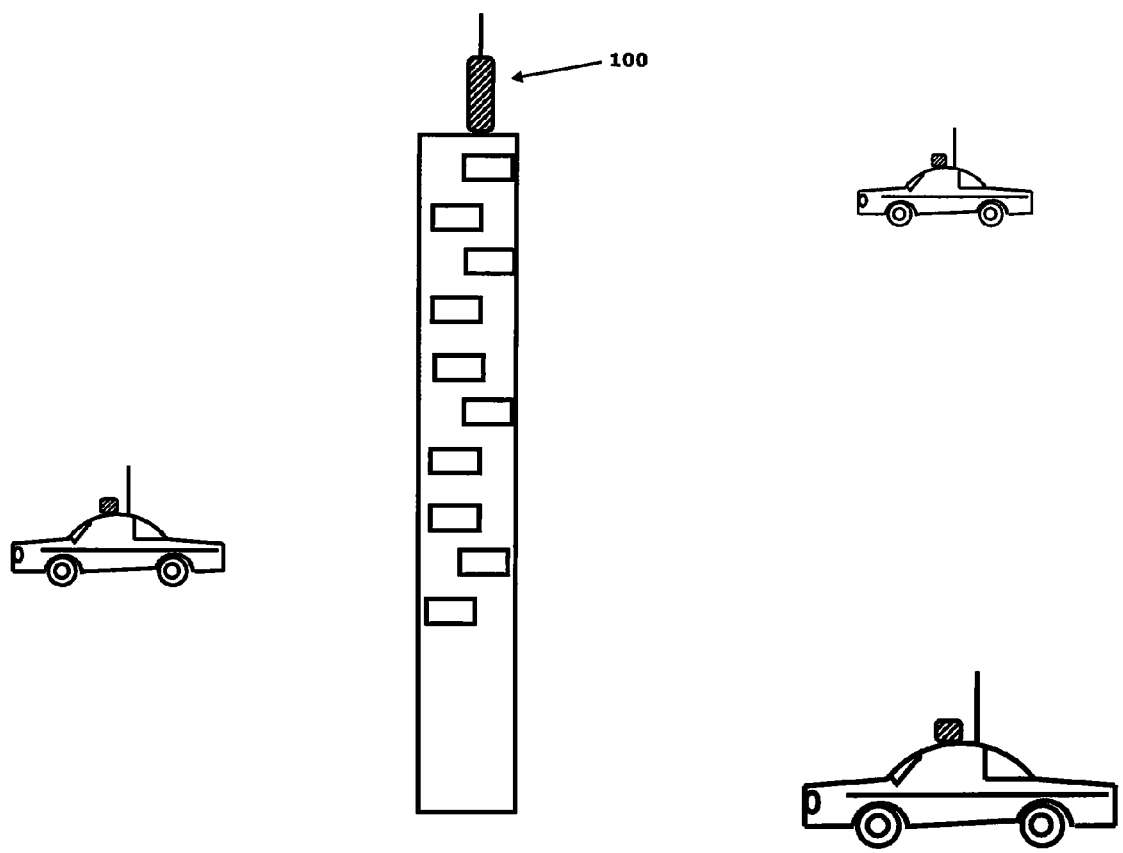
FIG. 1 is a diagrammatic illustration of a Rapid Deployment Airborne Repeater (RDAR) system placed at an elevated position on top of a tall building in accordance with an example implementation of the present disclosure.

Repeater devices are configured to amplify received signals and at least nearly simultaneously re-broadcast the signals with additional power. The higher power transmitted signal from the repeater, originating from a substantial height above the ground, thereby serves to greatly boost the effective range of mobile communications.

A recurring problem with many public safety communications systems is the loss of infrastructures as a result of disasters. At a time when critical communication is desperately needed, systems fail due to damaged equipment, downed towers, flooding of equipment, generators, underground cabling damage, and extended power outages. Emergency generators can be flooded out or unreachable for refueling due to roads blocked with debris. These types of situations have occurred repeatedly in recent years at disaster sites around the world. Currently standalone portable repeaters from the size of small suitcases, to as large as a medium sized file cabinet, weighing from a few pounds to as much as fifty (50) pounds or more, are utilized to re-establish communication systems at ground level (e.g., repeater is communicatively linked to a nearby elevated antenna, etc.).

The antenna coaxial cable, by nature, degrades the power of transmit and receive signals. The amount of signal power degradation increases with higher frequencies, smaller diameter cables, and longer cable runs. This factor is limiting to the effectiveness of ground based portable repeaters as small diameter cables may be used to allow portability.

Permanently installed repeaters use large diameter rigid cabling which is able to more effectively transfer the energy to and from the antenna than the small diameter flexible cables used with portable repeaters. For example, the diameter of the rigid cabling may be at least approximately three quarters of an inch diameter to at least approximately two inches or more. These permanent type cables are far too large, heavy, and inflexible to be used in a portable application.

What is needed is a portable, quickly deployable, portable voice communications solution that is not exposed to damaging forces. The equipment is stored in a safe place until needed and then deployed after the event has passed.

The present disclosure is directed to a radio voice communications system. The system is brought out when needed and deployed quickly to re-establish previously existing communications channels. This system is portable—even by a single person on foot. The system can be positioned at an elevated operating height in a number of different configurations, depending upon the situation.

Portable repeaters currently in use as a way of backup communications are designed to work in almost all cases from ground level. This requires the use of a coaxial cable to connect to the antenna, which is normally positioned at an elevated location so as to create a maximum coverage area.

The current disclosure, known as a Rapid Deployment Airborne Repeater (RDAR) system, can be used as a temporary, semi-permanent, or permanent mounted range boosting device (repeater) that is positioned (deployed) at the top of a tower. This device may be deployed in minutes, and is positioned at an elevated location. Various devices are available to position the RDAR system. For example, a helium blimp may be utilized to lift the RDAR system to a suitable operating height (see FIG. 2). One factor that sets this system apart from all others is that the repeater is designed to operate at the same height as the antenna, thereby eliminating the long coaxial cable normally required, hence the term "airborne" applies. Additionally, the portable repeater system is configured to be deployed at the same height as the antenna to at least substantially eliminate antenna transmission line signal losses.

FIG. 1 illustrates the RDAR system temporarily mounted on a building top.

Figure 2:
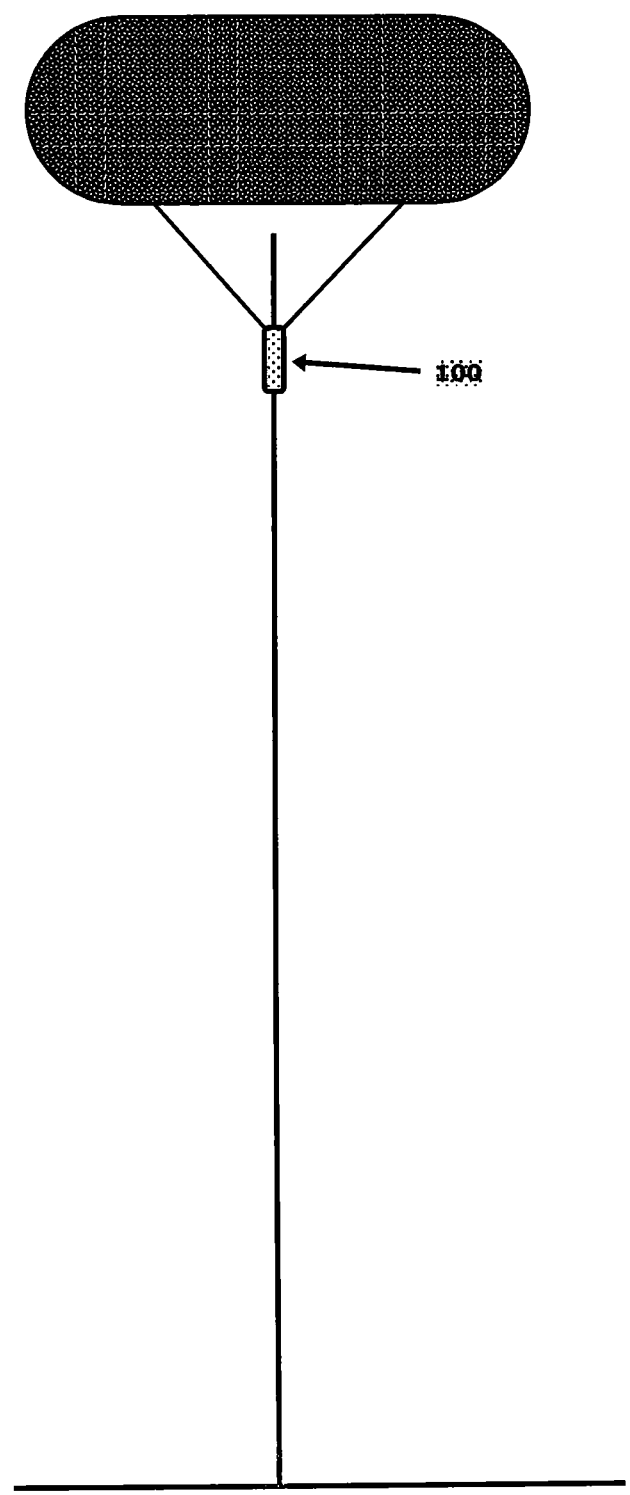
FIG. 2 is a diagrammatic illustration of an aerial supported RDAR configured to cover a radius of many miles based upon the height of the RDAR system in accordance with an example implementation of the present disclosure.

FIG. 2 shows a RDAR system supported by a helium blimp, which is tethered at an operating height.

Figure 6:
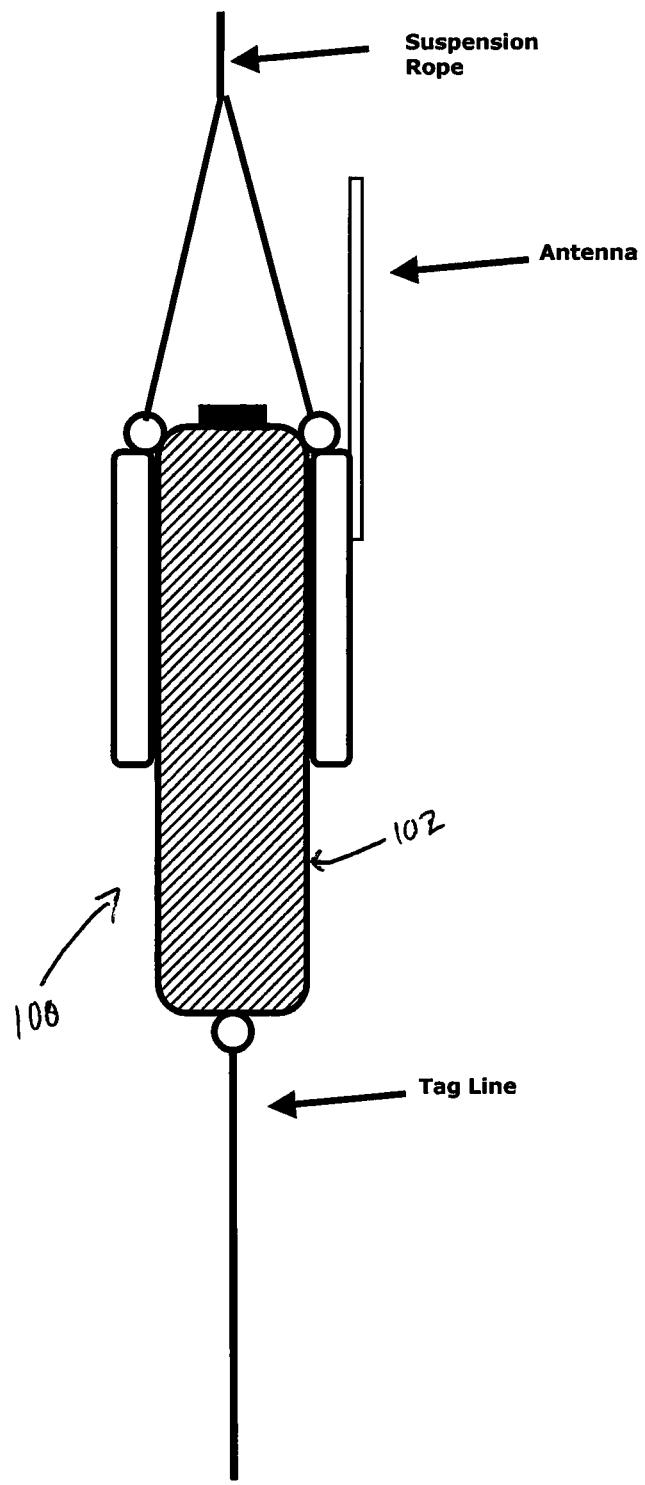
FIG. 6 is a diagrammatic illustration of a RDAR system suspended from a structure using ropes in accordance with an example implementation of the present disclosure.

FIG. 6 shows a RDAR system positioned using a rope and tag line as would be used with an existing structure for support.

The RDAR system weighs at least approximately eight pounds to at least approximately twelve pounds and is therefore light enough to be lifted with a reasonably sized blimp. For example, an airborne device (e.g., a blimp) of at least approximately seventeen feet in length may bear the RDAR system payload.

The RDAR system does not use a coaxial antenna cable of any significant length, and therefore operates at maximum efficiency because the RDAR system is located at the same height as the antenna. The compact design of the RDAR system allows it to be easily transported and used at elevated locations.

The RDAR system is designed to have mechanical robustness that allows the system to be transported and hoisted to elevated positions without damage. The RDAR system may be at least substantially housed within a sealed protective case which may be impervious to weather.

Any number of devices can be improvised to position the RDAR system as high as possible for use in emergency situations. In addition to the illustrations given above, other objects can be used as support structures that include, but are not limited to: flag poles, street lights, water towers, large extension ladders, portable telescopic masts, mobile towers, tall buildings, fire rig ladders, cranes, basket trucks, and so forth.

Example Implementations

The RDAR system 100 is designed to be water proof (actually submersible), and shielded against electromagnetic interference (EMI) and/or electromagnetic pulses (EMP). The RDAR system 100 is mechanically designed to be robust and not easily damaged by rough handling.

The RDAR system 100 may be stored in a safe location, such as a concrete and steel tower equipment room, a fire station, or similar location. It can also be carried in a vehicle such as a fire rig or police car trunk.

The case 102, or vault, of the system 100 is a light, rugged composite design that includes an integrated Faraday Cage for EMI/EMP suppression. NEMP suppression devices are installed on its power input and antenna lines to protect the equipment in case of nuclear or solar generated EMP events.

The internal electronics package is built on a modular frame, which is shock mounted for protection from dropping and shock loads. Additional exterior shock absorbing materials may be used to maximize its ruggedness.

Figure 3:
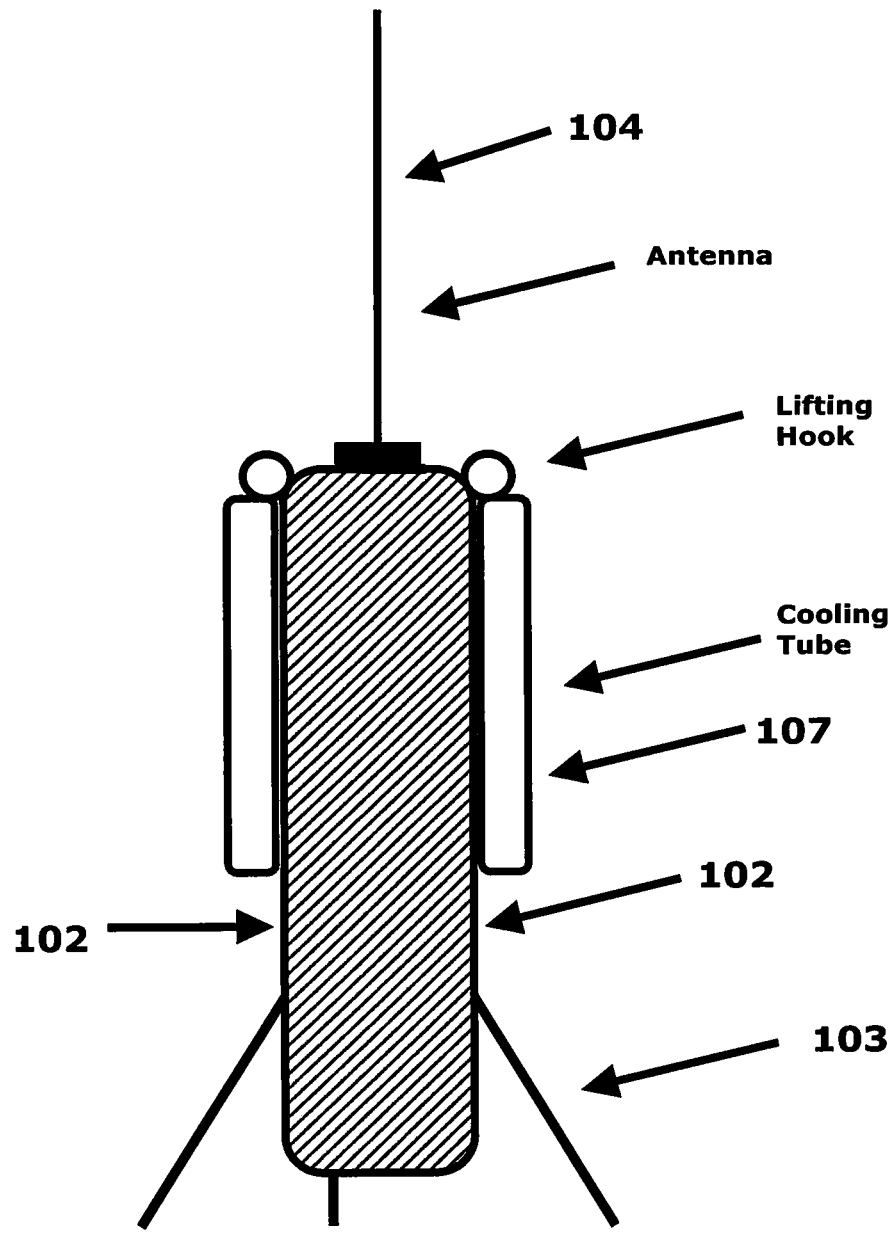
FIG. 3 is a diagrammatic illustration of a RDAR system configured for use on a flat service utilizing a tripod in accordance with an example implementation of the present disclosure.
Figure 18:
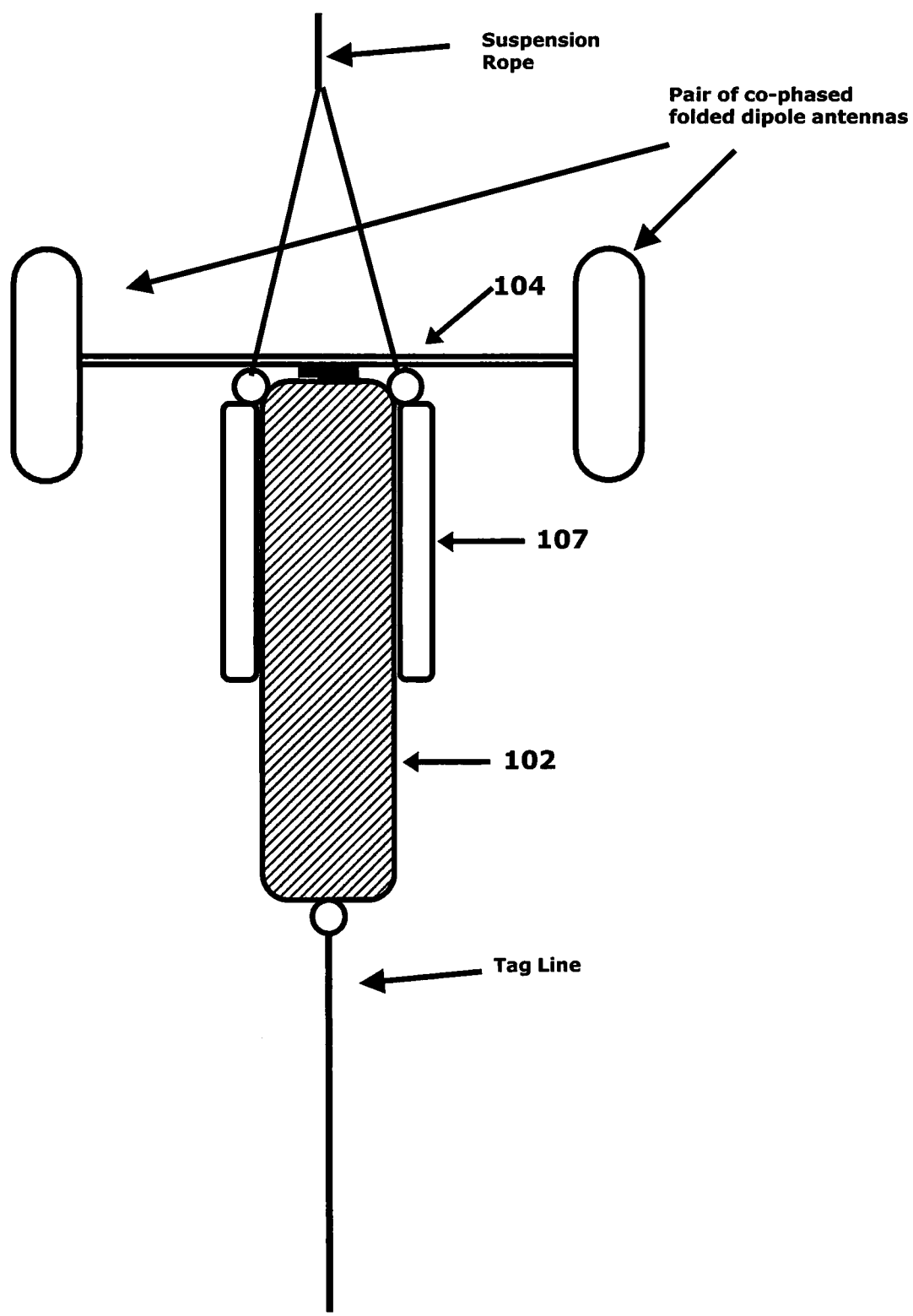
FIG. 18 is a diagrammatic illustration of a RDAR system having a dual folded dipole antenna array, which eliminates coverage shadows when the unit is deployed next to a metallic support structure, such as a tower, in accordance with an example implementation of the present disclosure.
Figure 19:
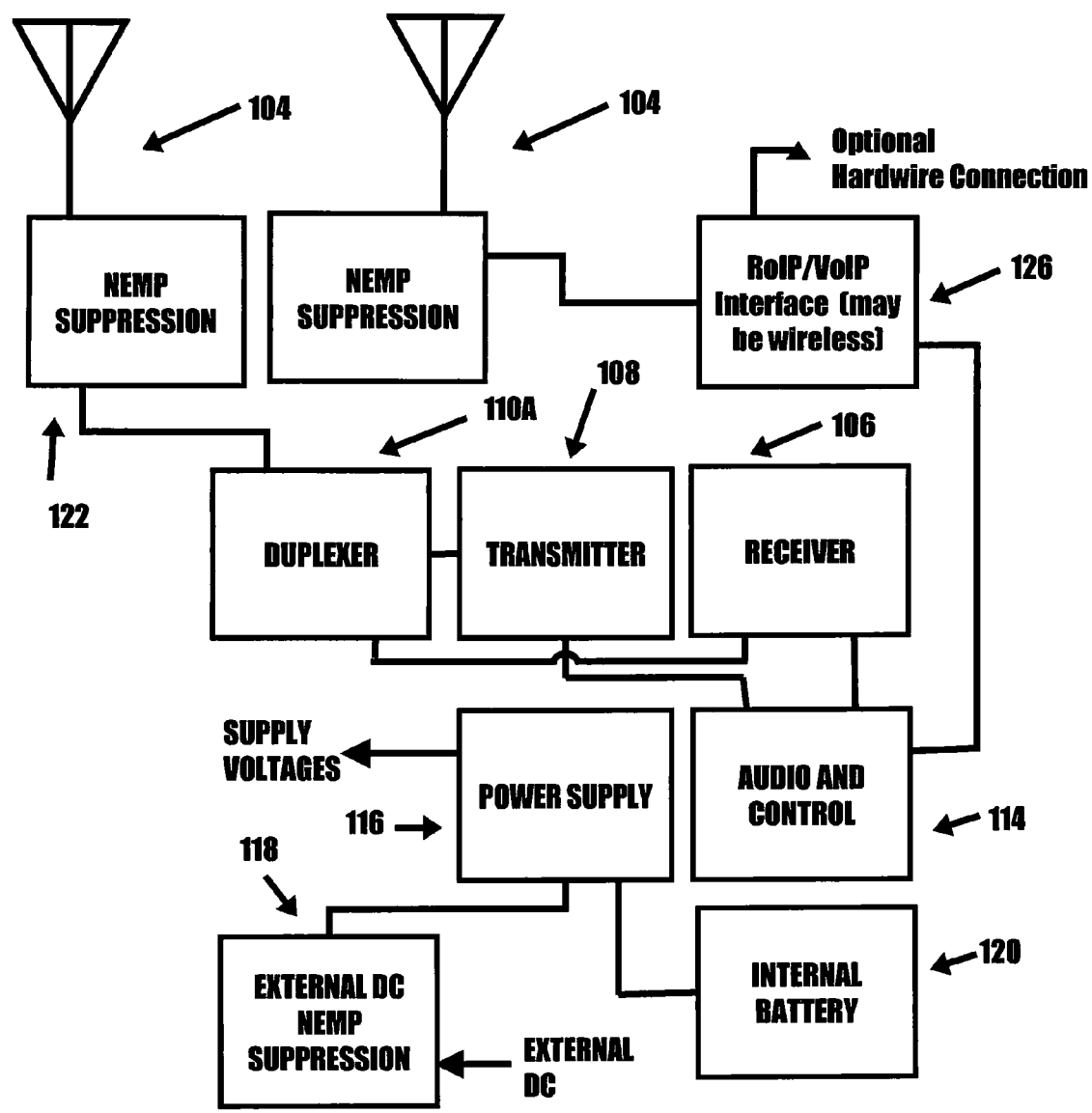
FIG. 19 is a diagrammatic illustration of an in-band repeater having a VoIP/RoIP (Voice Over Internet Protocol/Radio Over Internet Protocol) interface via wireless or hardwire connection, in accordance with an example implementation of the present disclosure.

FIG. 3 shows an example implementation of the RDAR system 100 unit on a flat surface. This is a tripod base unit 103 with an antenna 104 mounted thereon. This would be typical of a local use UHF repeater that, if placed on a hilltop, or building top, would provide perhaps at least approximately five to at least approximately eight mile radius of coverage, depending on terrain. This application would be typical of a local disaster or wildfire type of application. As shown in FIG. 18, the antenna may comprise a pair of co-phased folded dipole antennas 104.

Figure 8:
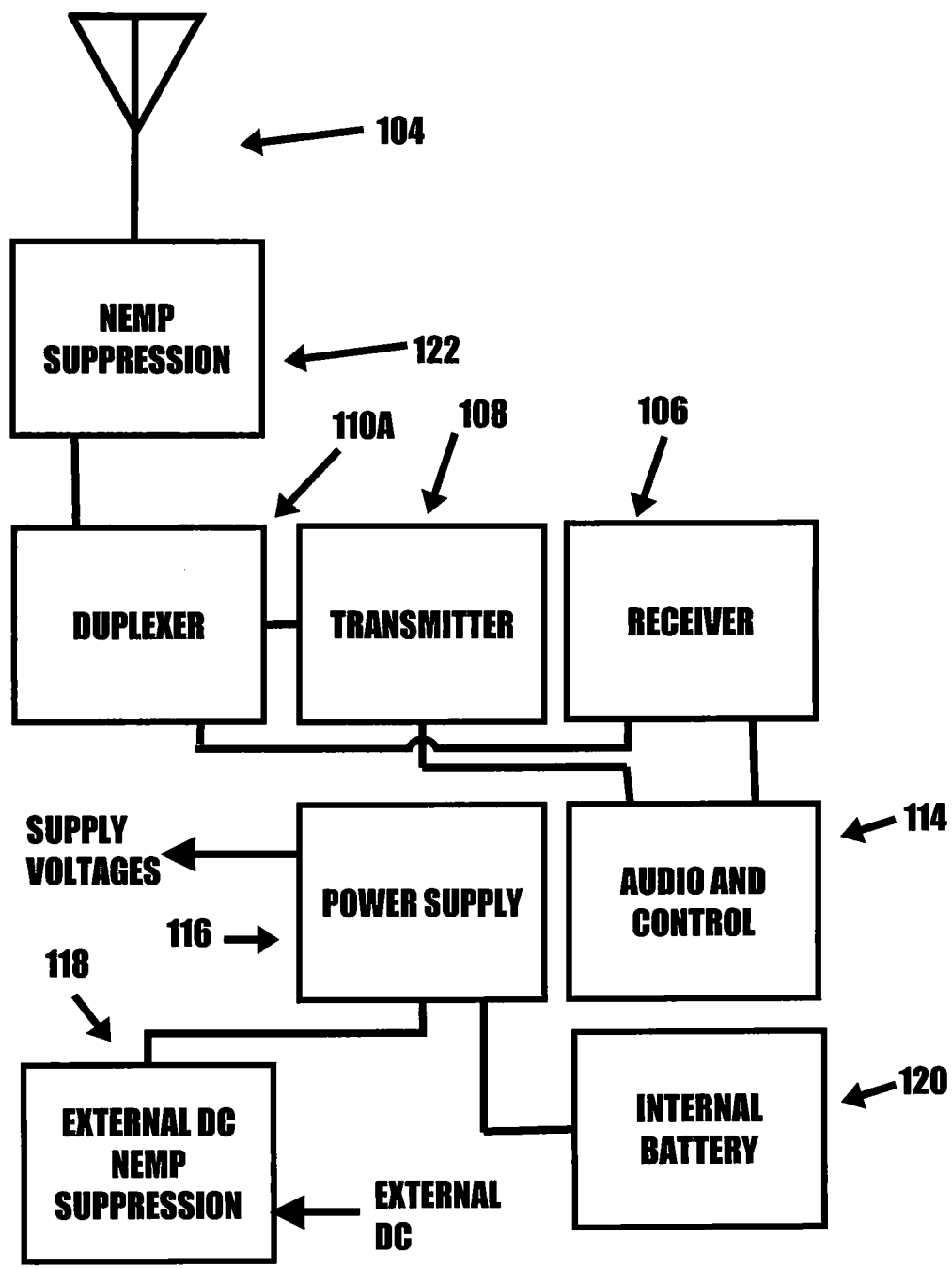
FIG. 8 is a diagrammatic illustration of a block diagram of a RDAR system configured as a simple in-band repeater in accordance with an example implementation of the present disclosure.
Figure 23:
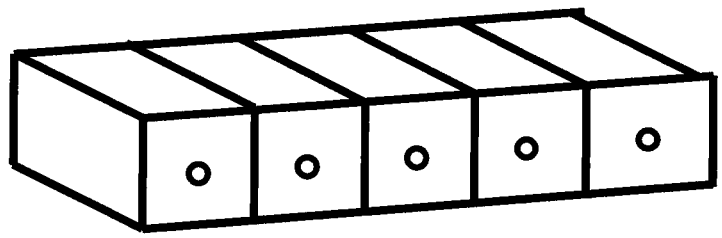
FIG. 23 is a diagrammatic illustration of a basic configuration of the resonant cavities in a standard mobile duplexer as compared to the resonant cavities of a communication isolator in accordance with an example implementation of the present disclosure.
Figure 23:
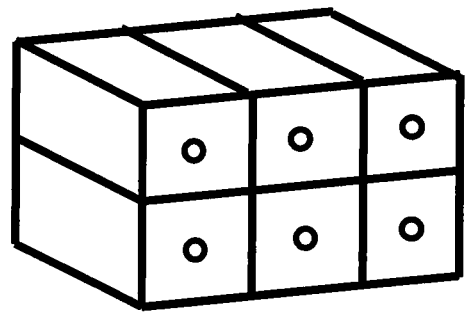
Figure 23:
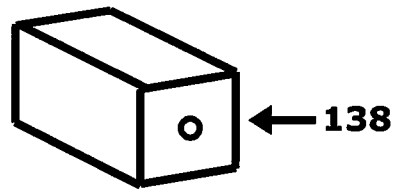

FIG. 8 shows the block diagram of an implementation of the basic in-band RDAR system 100. A receiver 106 and transmitter 108 are part of the repeater. There is a specially designed communication isolator, as described herein, having a compact form that will fit in the cylindrical vault. The compact design of the communication isolator uses cavities 138 (i.e., resonant circuits configured to at least substantially allow passage of or notching out signals occurring within a limited range of frequencies) that are configured in a vertical stack rather than a horizontal row, so as to conform to the shape of the vault (see FIG. 23). In other words, a plurality of cavities 138 are employed to function as the communication isolator.

Figure 9:
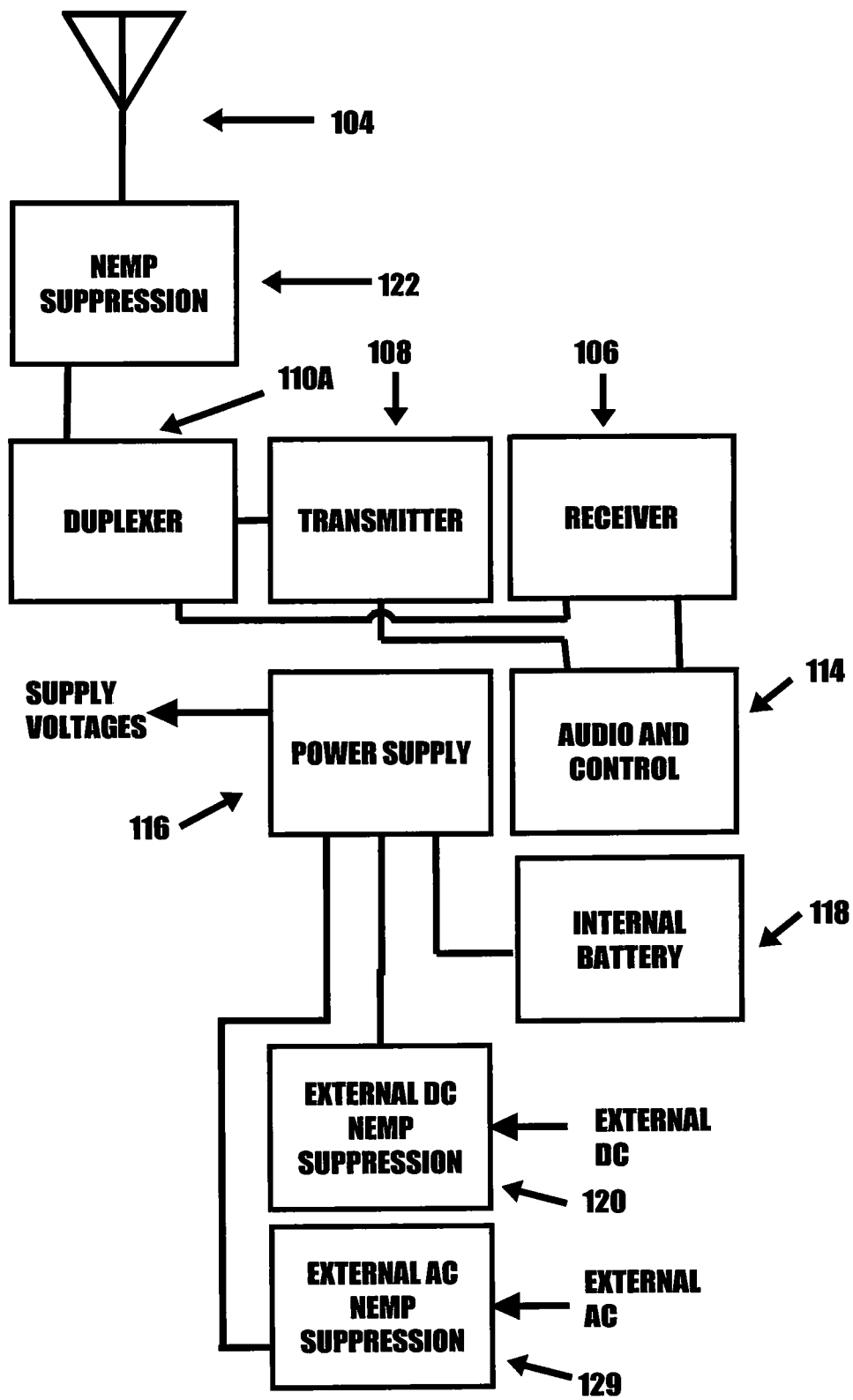
FIG. 9 is a diagrammatic illustration of a block diagram of a RDAR system configured as a simple in-band repeater with external AC supply, as well as an external DC supply in accordance with an example implementation of the present disclosure.
Figure 10:
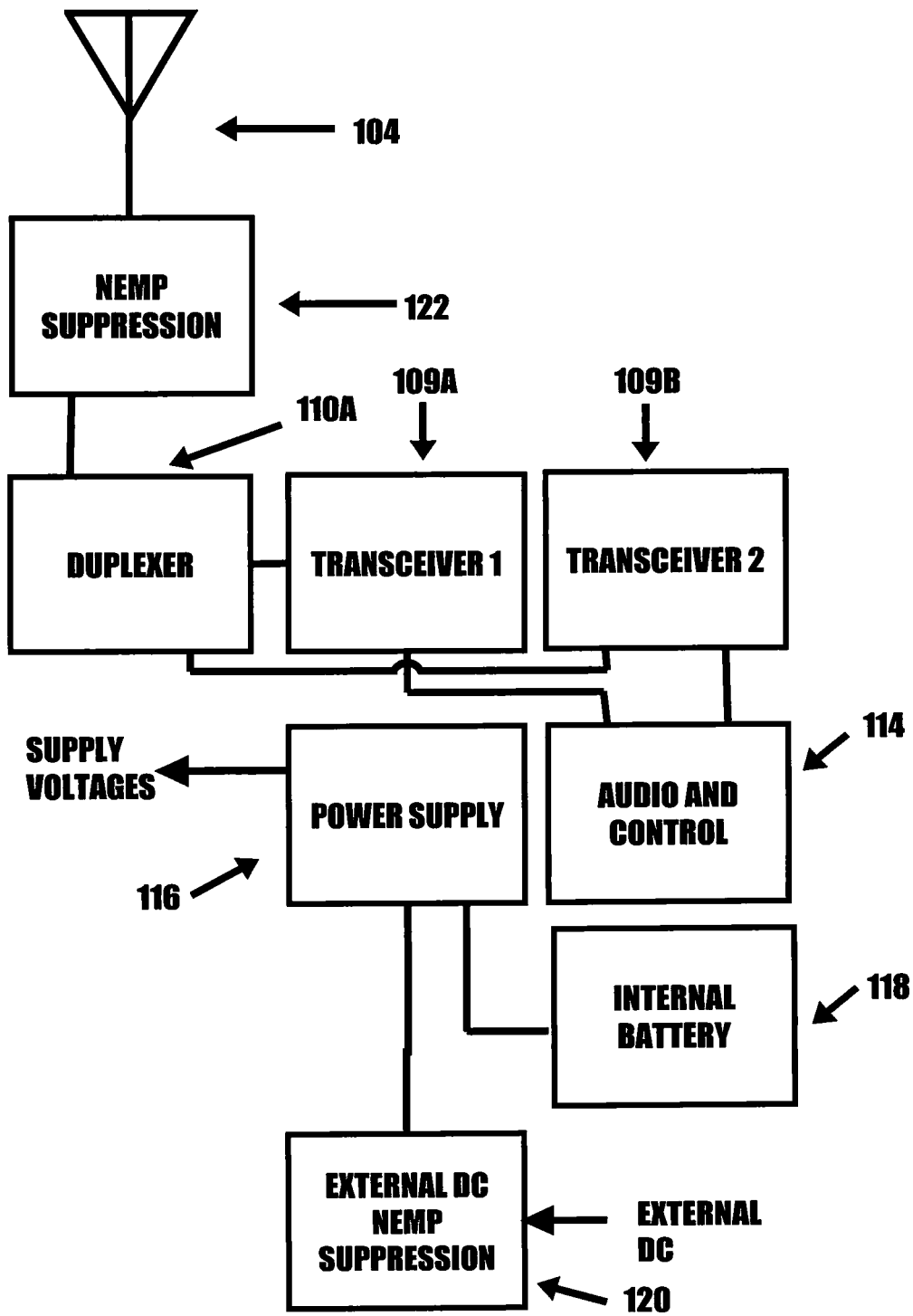
FIG. 10 is a diagrammatic illustration of a block diagram of a RDAR system configured as a cross band gateway repeater in accordance with an example implementation of the present disclosure.
Figure 11:
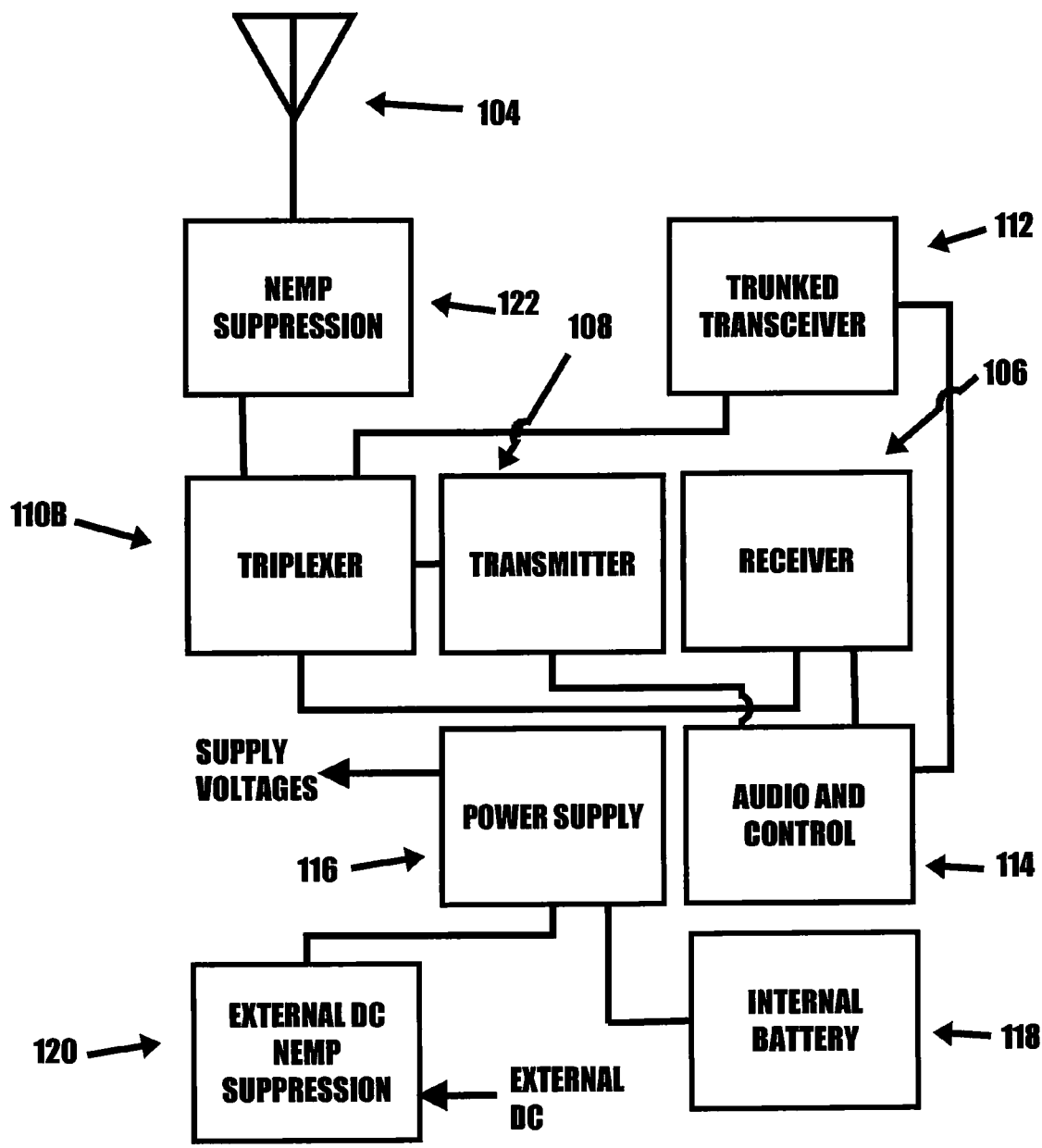
FIG. 11 is a diagrammatic illustration of a block diagram of a RDAR system configured as a hybrid of an in band repeater linked to a trunking system via a portable radio in accordance with an example implementation of the present disclosure.
Figure 12:
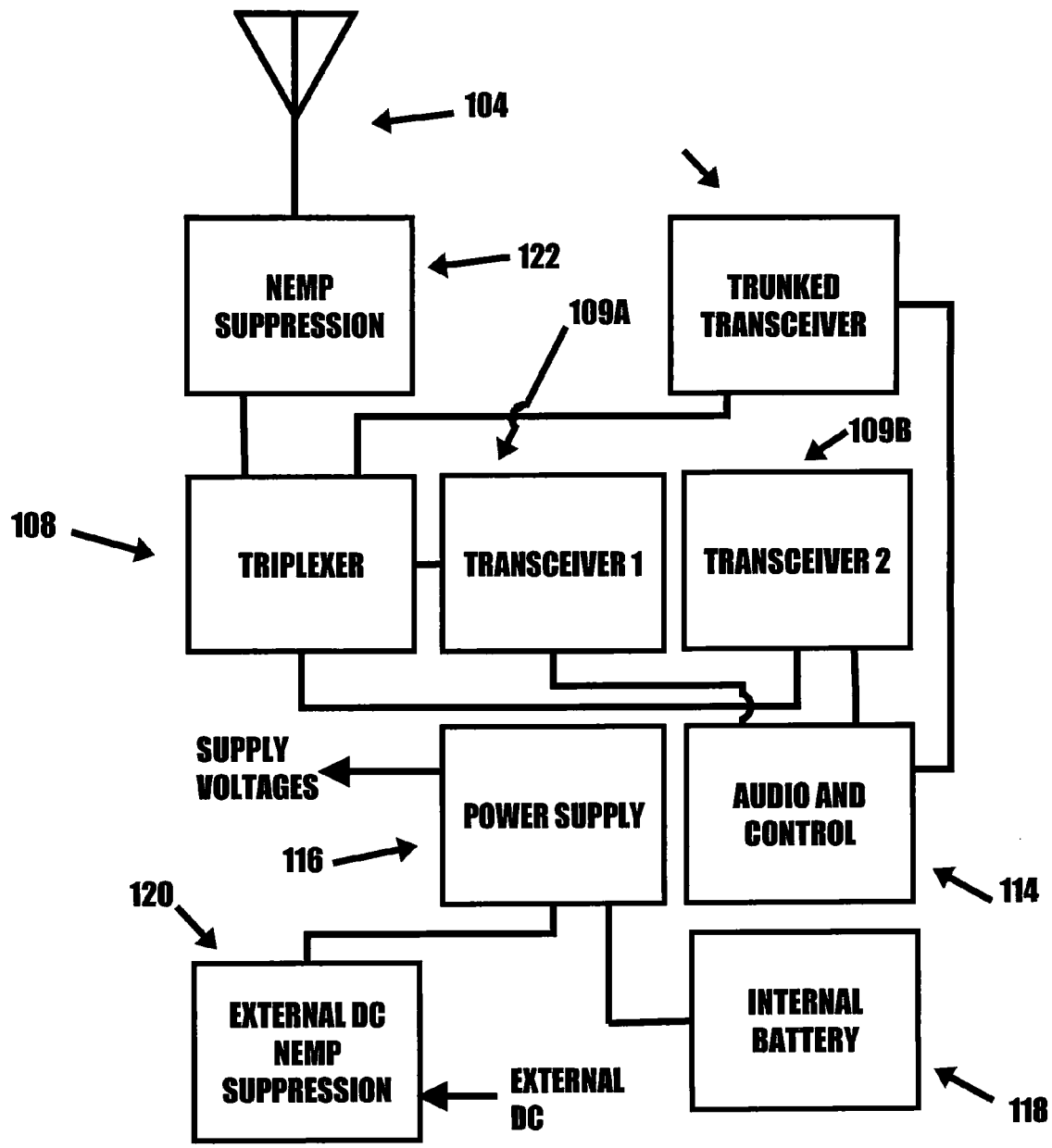
FIG. 12 is a diagrammatic illustration of a block diagram of a RDAR system configured as a hybrid of a gateway repeater linked to a trunking system via a trunked portable radio in accordance with an example implementation of the present disclosure.

In cross band, or gateway models, a triplexer isolator and filtering system, or two antennas may be used. In another implementation of the system 100, as shown in FIG. 12, the hybrid is an in-band repeater or cross band gateway that is coupled with a portable trunked transceiver 112, to create a bridge between a local repeater, and a trunking system. In areas where trunking system coverage is poor at ground level, having an elevated RDAR system 100 with a gain antenna 104 may improve effective operation into the trunking system, as well as enhance mobile-to-mobile communication in a local area. (See FIGS. 11 and 12 for block diagrams of the hybrid version with trunked interface). As shown in FIGS. 11 and 12, the RDAR system 100 includes a receiver 106, a transmitter 108, and a triplexer 110B. The triplexer 110 is operatively coupled to the receiver 106, the transmitter 108, and a trunked transceiver 112. A trunked radio system is a specialized computer controlled repeater system with one or more towers, and multiple frequencies, which allows channelized, semi-private conversations between one or more groups of users than it actually has allocated RF channels. The individual trunked transceiver functions as a link to the trunking system. The individual trunked transceiver is configured to join with the in-band part of the repeater, via an audio bridge circuit, (and so the local mobile radios) into the talk group desired in the trunking system. In areas of poor trunked system coverage, the trunked receiver effectively restores solid communications as though the trunking system coverage was ideal. The triplexer is a filtering system that isolates signals passing to and from the common antenna so that they do not create mutual interference with each other. An audio and control device 114 is communicatively connected to the receiver 106 and the trunked transceiver 112. The device 114 is configured to sense receive audio and route it to the transmitter(s). It also causes the transmitter(s) to key up when inbound audio traffic occurs. The system 100 also includes a power supply and switching device 116 that is configured to regulate incoming supply voltage and convert it to levels required by circuitry and distributes it via wiring throughout the RDAR. The system 100 also includes a power source 118, such as an internal battery supply, for at least powering the system temporarily when external sources of power are not available. The system 100 may also be at least partially powered by an external power source (e.g., a 12 volt direct current (DC) supply) that is furnished through a DC NEMP 120. As shown, the system 100 also includes a NEMP suppression device 122, which is communicatively couples the duplexer/triplexer 110A/110B to the antenna 104. The NEMP suppression device 122 is configured to block harmful voltages which may occur during EMP events, and thus prevent damage to the RDAR components. As shown in FIG. 9, the system 100 may also include an external alternating current (AC) power source that is furnished through an AC NEMP 124. The AC NEMP also serves to block harmful voltages which may occur on the AC input during EMP events, and thus prevent damage to the RDAR components FIG. 10 illustrates an example implementation of the RDAR system 100 that includes a first transceiver 109A and a second transceiver 109B. This is a cross band or gateway configuration. This creates a link across two communications channels, each of which is in a separate frequency band, such as VHF and UHF. This configuration passes traffic both directions so as to create a patch between the two channels. A duplexer may be used to allow the sharing of a single antenna, or in some cases, two antennas may be used, each tuned for a respective individual band.

The communication isolator (e.g., duplexer/triplexer 110A/110B) comprises a vertical configuration to allow the duplexer/triplexer 110A/110B to fit in the compact cylindrical vault 102 of the RDAR system 100. Thus, the mechanical configuration provides compactness required for mounting within a chassis of the internal frame while providing duplexer and/or triplexer electrical functionality. The duplexer/triplexer cavities are vertically stacked rather than configured in a horizontal row, and may have a dimension not exceeding approximately six inches by six inches by ten inches. (See FIG. 23).

In an implementation, a vault 102 dimension is a cylinder eight inches in diameter by thirty-six inches in length. Certain models may be larger or smaller than this example depending on the application and power output of the unit.

Figure 13:
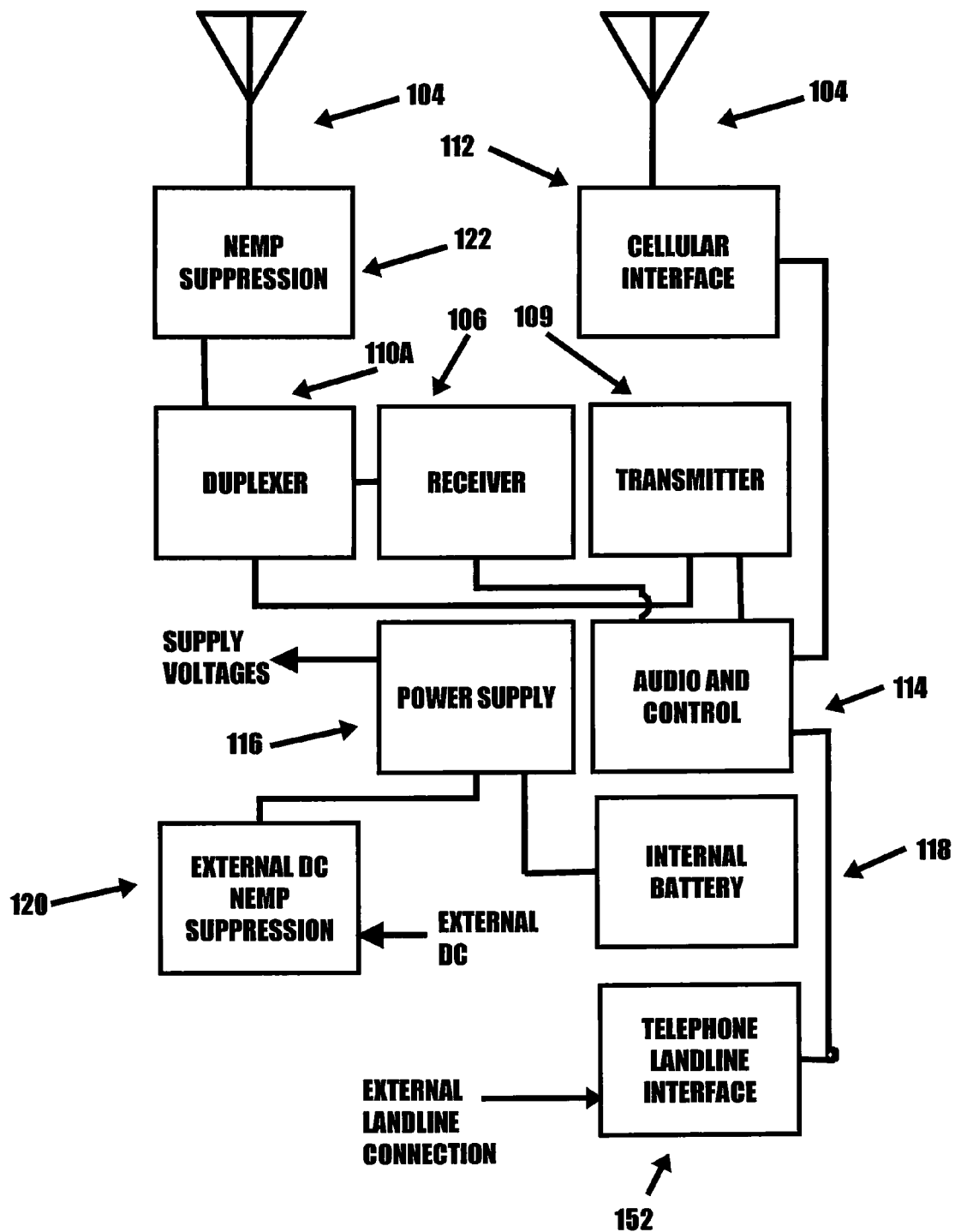
FIG. 13 is a diagrammatic illustration of a block diagram of a RDAR system configured as a link from mobile radio to a cellular telephone system in accordance with an example implementation of the present disclosure.

A suitable control circuit and a suitable VOX (Voice Operated Transmitter) feature are used to manage the operation of the system 100. A number of additional peripheral features are available with these boards, such as auto-identification, automatic cooling fan operation, and so forth. Phone patching may also be available. (e.g., see FIG. 13 illustrating a block diagram of a RDAR system 100 with a cellular interface 122). This allows mobile radios to interface with a cell system via DTMF commands from the keypad of the radio.

Figure 14:
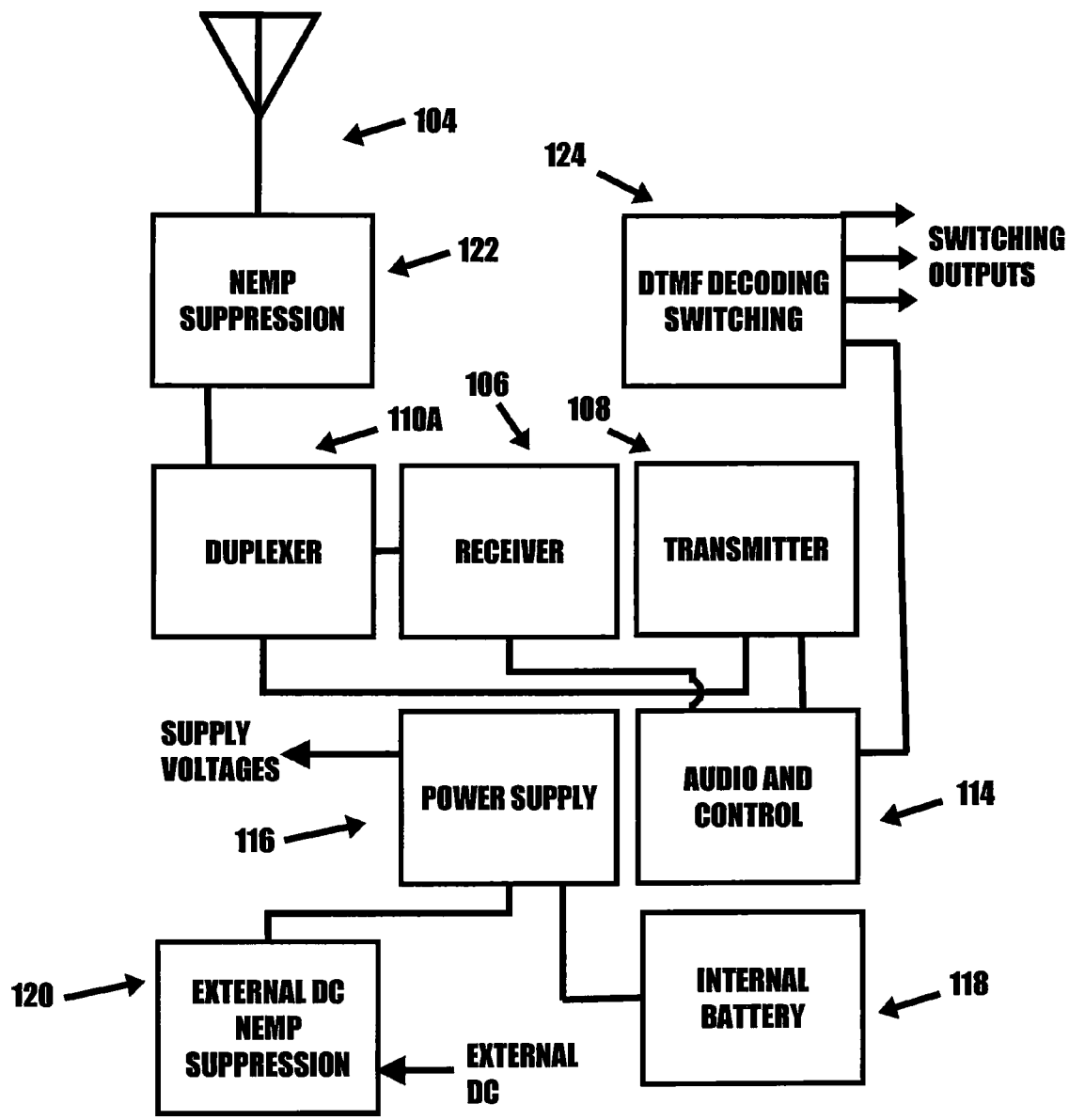
FIG. 14 is a diagrammatic illustration of a block diagram of a RDAR system configured with a DTMF (Dual Tone Multi-Frequency) switching accessory in accordance with an example implementation of the present disclosure.

A DTMF decoding board device 124 recognizes DTMF tones sent over the air, and responds by initializing corresponding switch closures. A user with a portable radio for example, can send DTMF tones from the keyboard. The RDAR upon receiving DTMF tones may close relays. The relays may be used to control any number of remote devices such as cameras, security devices, lighting, or even explosive charges that may be placed to destroy the RDAR system 100 by a remote device when used in certain military applications. (See FIG. 14).

The power supply may be configured in a variety of ways. For example, alkaline batteries may be used with some lower power models. Rechargeable batteries may be used on other models. A regulator circuit provides voltages to run the boards and radios. External charging terminals are provided for rechargeable models and a charge management circuit may be used to maintain internal battery charging as needed. Nuclear Electromagnetic Pulse (NEMP) suppression devices 120, 122, 124 are used on external power inputs to the RDAR system 100, as well as antenna 104 inputs. These protect against nuclear EMP, solar EMP, as well as lightning. The antennas used with the RDAR system are normally of the type that are DC grounded to the case to minimize damage from lightning.

In an implementation, the case, or vault 104, is cylindrical and built from composite materials. Copper foil or mesh may be integrated into the walls and end caps of the vault to create a Faraday cage, which serves to prevent EMI/EMP energy from entering the vault. There may be additional refinements in the production models to provide for external connections such as charger, phone lines, data connections, and antennas.

Figure 5:
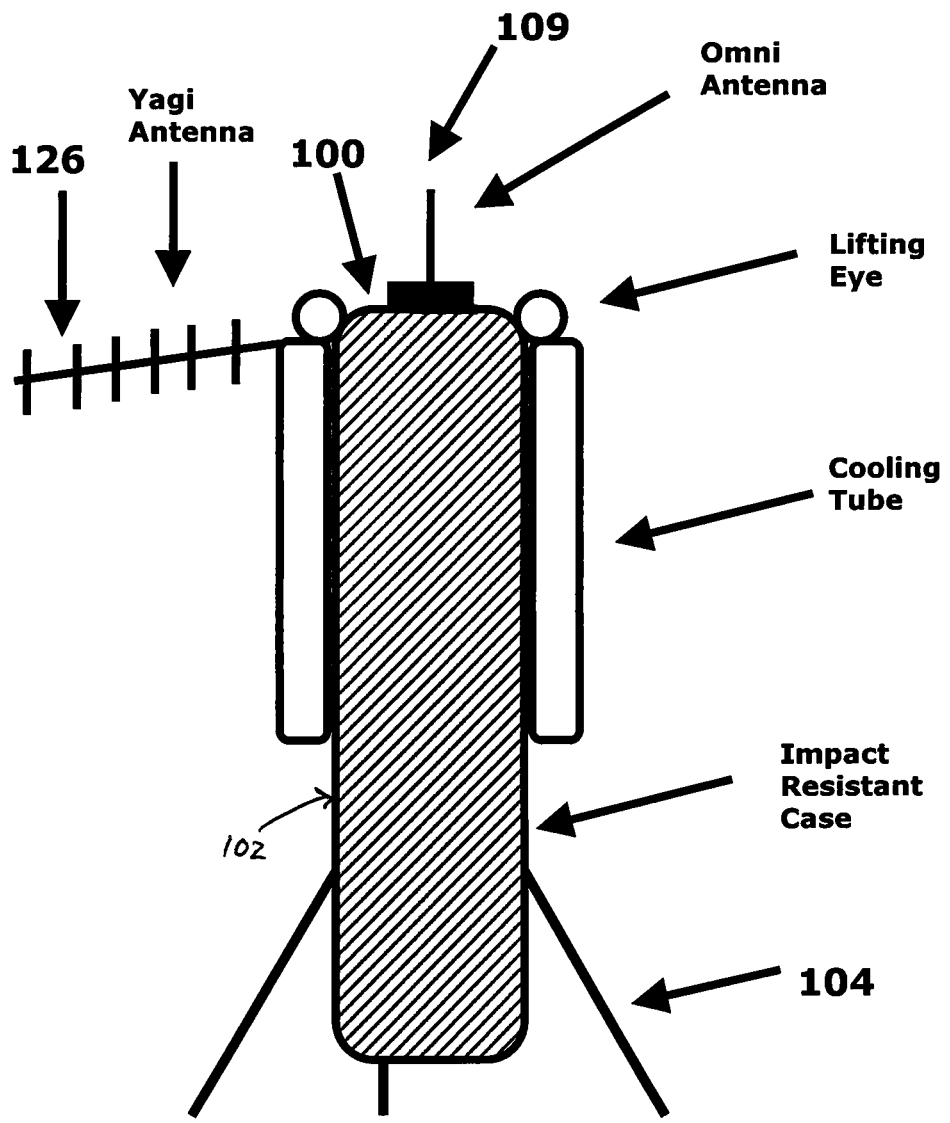
FIG. 5 is a diagrammatic illustration of a RDAR system configured to provide a cellular to radio channel gateway in accordance with an example implementation of the present disclosure.

FIG. 5 shows an implementation of the RDAR with a combination of a small unity gain omnidirectional antenna and a Yagi directional antenna 126 (i.e., Yagi-Uda antenna is directional along an axis perpendicular to a dipole in a plane of the elements). This type of configuration could be a cross band repeater with concentrated coverage in the direction that the Yagi antenna is pointed. This could also be a cellular link from a conventional radio channel to a cellular phone tower or a satellite phone. This would provide a telephone system gateway to allow portable or mobile radios to access a cellular telephone system from a distance.

Figure 7:
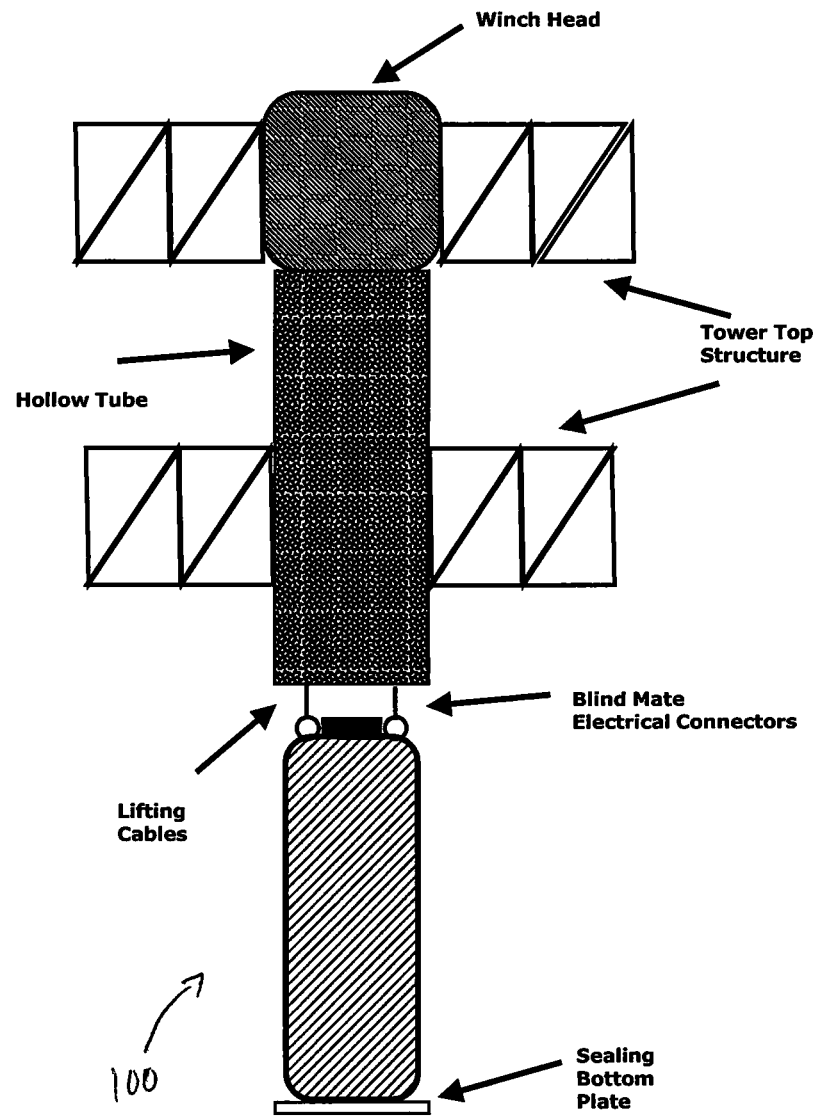
FIG. 7 is a diagrammatic illustration of a RDAR system as a semi-permanent repeater installed on a tower top, wherein the electronics package is illustrated being winched down for service in accordance with an example implementation of the present disclosure.

FIG. 7 shows a RDAR system having a docking station configuration. This is a permanently mounted RDAR system 100, which would be normally mounted on a tower top. External connections allow use of full sized tower mounted antennas. The electronics package is modular and can be remotely installed and removed with a winch and blind mate connector set, which allows a defective unit to be removed and replaced by remote control, from the ground. The docking station is powered by permanent external AC power, which operates the unit and maintains charge on a backup battery that is integral to the equipment module.

Figure 21:
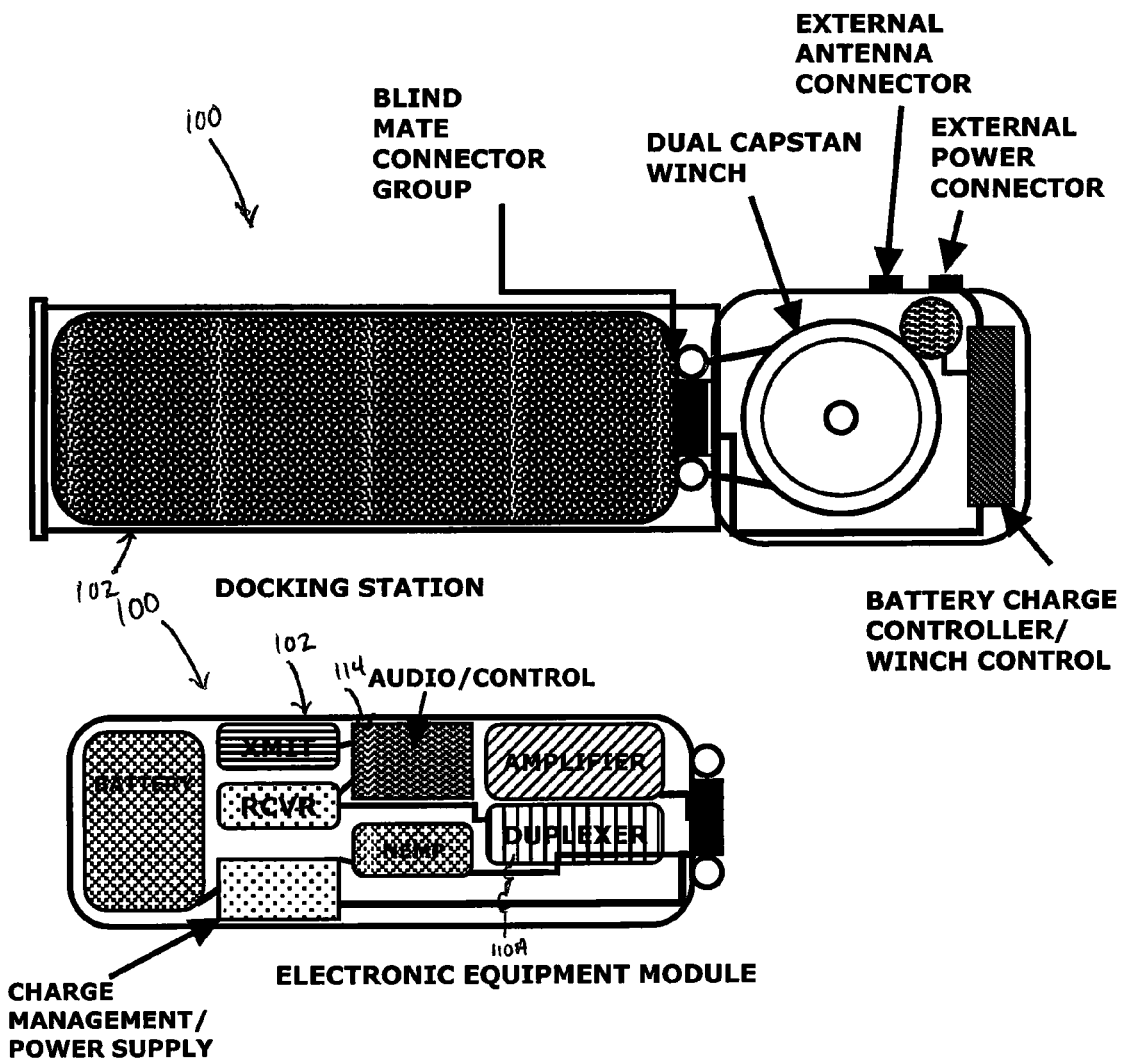
FIG. 21 is a diagrammatic illustration of a docking station and its associated electronic equipment module in accordance with an example implementation of the present disclosure.
Figure 22:
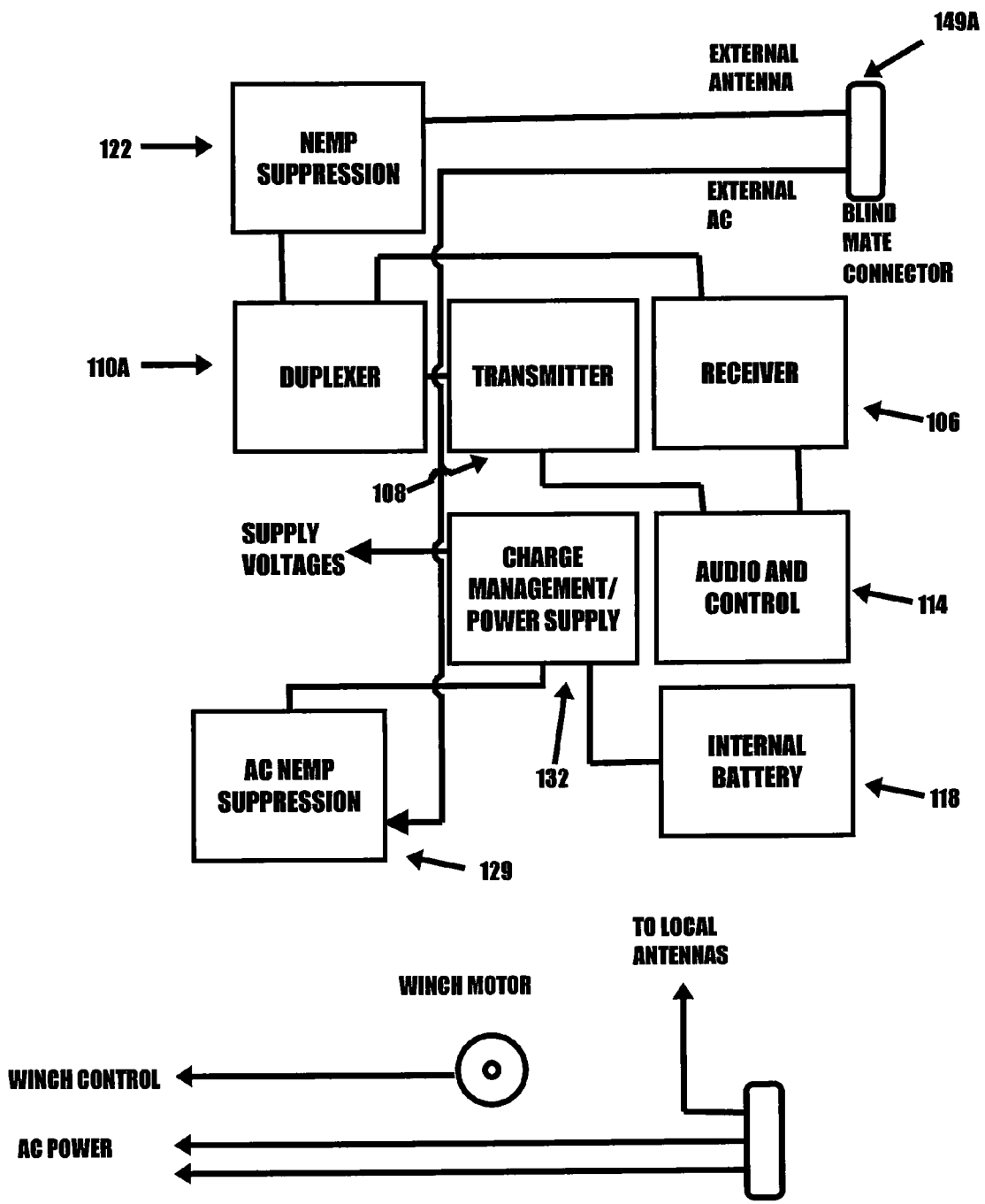
FIG. 22 is a diagrammatic illustration of a block diagram of a RDAR system and the docking station in accordance with an example implementation of the present disclosure.

The onboard battery may provide automatic backup power from a few hours to several days, depending on the size of the battery and the power requirements of the individual unit. The size of the onboard battery may vary from a few amp-hours to one hundred (100) amp-hours or more. The RDAR system 100 may further employ integrated vault heating and cooling devices 107 to ensure a suitable temperature environment for the components of the RDAR. FIG. 21 shows cross section views of the docking station and the electronic equipment module. For example, FIG. 21 illustrates a RDAR system 100 that includes a communication isolator having a vertical configuration.

As shown in FIG. 8, the RDAR system 100 includes a transmitter 108 configured to transmit a signal, a receiver 106 configured to receive a signal, a communication isolator configured to isolate the transmitter 108 and the receiver 106 to allow the devices to use a common antenna (e.g., antenna 104). The communication isolator (e.g., duplexer/triplexer) is constructed to be compact and fit within a vault. For example, the duplexer/triplexer is designed to fit within a cylindrical vault or the like. The duplexer/triplexer may be constructed in a vertically stacked cavity configuration that allows it to conform to a cylindrical enclosure (e.g., duplexer/triplexer is at least substantially enclosed within the vault). The duplexer/triplexer is housed within the vault and configured to communicatively isolate the transmitter(s) from the receiver(s), which allows the transmitter(s) and the receiver(s) to utilize the common antenna. As described above, a cylindrical vault may have a diameter of at least approximately eight inches and a length of at least approximately thirty inches. However, it is understood that other dimensions may be employed based upon the requirements of the RDAR system.

The audio/control unit may be comprised of VOX circuitry configured to activate the transmitter upon receiver activity. There is a digital audio memory buffer that stores the incoming audio for a few milliseconds until the repeater has begun transmitting, thus avoiding lost first syllables from the user who has keyed up on the channel. The audio/control board has a number of features built in for enhancing repeater functionality.

Figure 20:
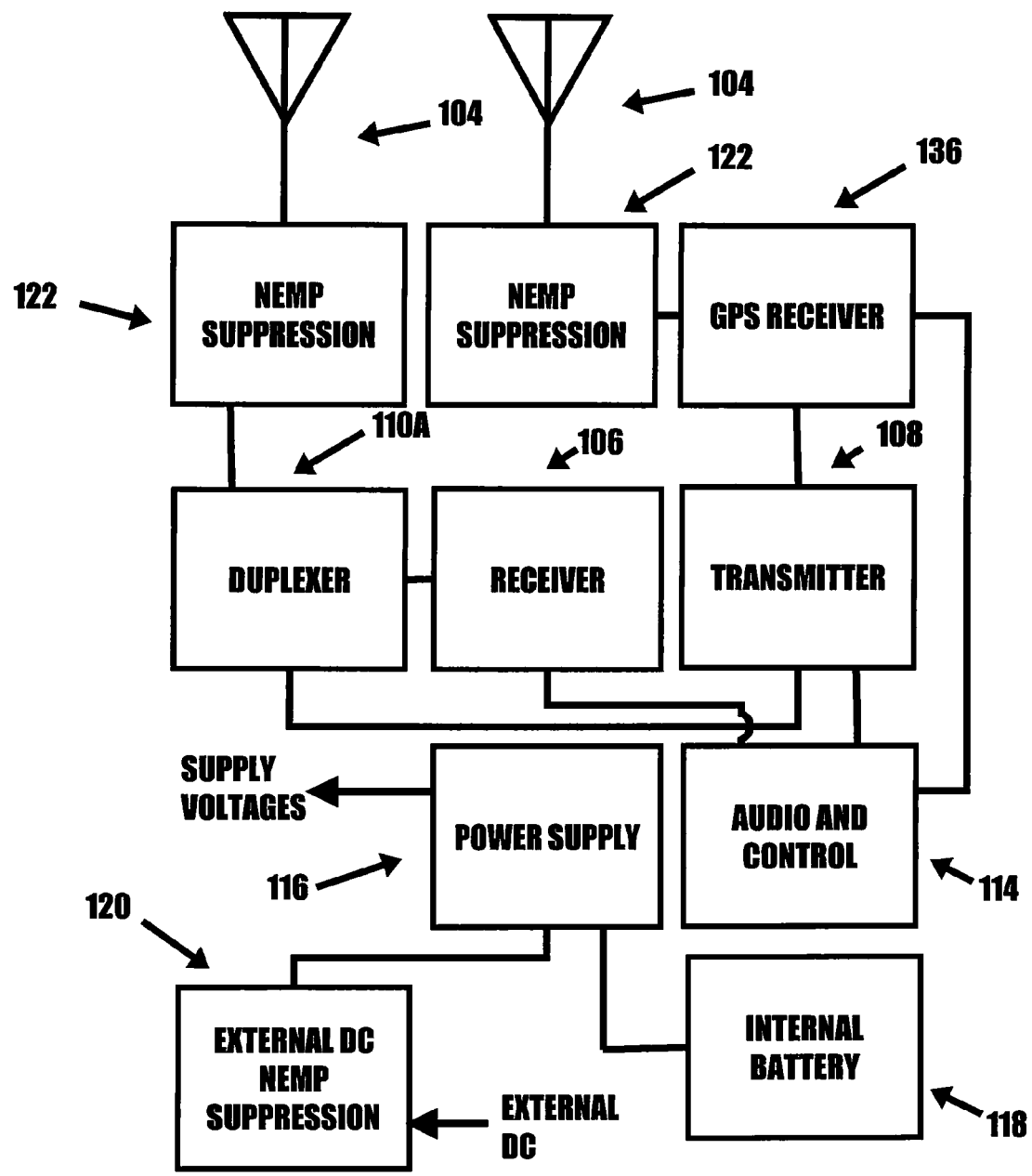
FIG. 20 is a diagrammatic illustration of an in band RDAR system with Global Positioning System (GPS) receiver for transmitting location data via the transmitter in accordance with an example implementation of the present disclosure.

It is understood that the RDAR device may include other electrical circuitry as well. For example, the RDAR may further include an amplifier that is configured to increase power output of one or more signals transmitted by the RDAR device. Additionally, the RDAR device may further include circuitry configured to perform remote switching, monitoring, and control of external devices. It may include a GPS (Global Positioning System) receiver 136 that can transmit data representing a location via radio channel data. (See FIG. 20)

RDAR Applications

RDAR units are typically pre-programmed as back-up repeaters for an existing communications system. Modular pre-tuned duplexers/triplexers can be used to change channels in seconds on in-band models. This allows flexibility to quickly change to match the frequency of the channel that needs to be restored.

Cross band/gateway models that utilize separate antennas, are able to be programmed for operating frequencies simply by changing channels on the internal transmitter and receiver. This allows ready adaptation to the situation, and eliminates the need for a separate RDAR unit for every existing channel.

In most cases, the channel being put back on the air with the RDAR unit may be somewhat more range limited than the original equipment would provide, depending on its deployed height and power output, but would allow a significant level of communication to resume on the existing frequency.

The RDAR system 100 can be configured to be on the same licensed frequency pair as the original system, and is equal to or less than the power of the original system equipment, and so may not create interference with surrounding systems. Existing mobile radios can utilize the restored channel instantly as though it were the normal operating channel.

In the case of a trunking system failure, backup conventional channels would be pre-programmed into all critical mobile radios, just as they would be for a trunking control failure of the system. Although at much less capacity than the trunking system, there may be a number of open conventional channels available for critical communications, depending on how many RDARs are deployed.

RDAR systems 100 can also be set up as communications bridges or patches between different channels so interoperability links can be added to an existing system. Such a link may allow communications between fire and EMS personnel, police and sheriff departments, or the like. In the case of a disaster, RDAR systems 100 can bridge communications between groups that have come in from surrounding areas to assist local authorities. An example might be an electric crew from another state that has come to assist in restoring power to a city. A RDAR system 100 could function as a communications bridge to link the outside crew to the local dispatch center. See the section on vehicular repeaters for more information.

It is contemplated that the RDAR system 100 may be utilized in other non-emergency situations as well. For example, a RDAR system 100 may be mounted on a mountain top mast with a solar panel to provide park personnel with permanent radio coverage in a game preserve.

Vehicular Repeaters

RDAR systems 100 are compact and portable and may also function as a local, portable, vehicular repeater that, unlike existing vehicular repeaters, is not permanently attached to a particular vehicle. Vehicular repeaters are used to boost coverage from a remote area that would be difficult to reach the existing infrastructure on portable radios. This is especially a common problem with firefighters working in the basement of a large concrete and steel building. The local vehicular repeater can receive the local radio signals and rebroadcast them at much higher power.

Vehicular RDAR systems 100 also can create interoperability between channels or trunked radio talk groups, as previously stated. So when an EMS crew travels to a disaster site, a vehicular repeater can be configured to be a patch between their normal channel and the local EMS channel, for example. Thus, communications can be established quickly with outside organizations that come to assist at a disaster scene using a RDAR system vehicular repeater as a communication link.

Figure 4:
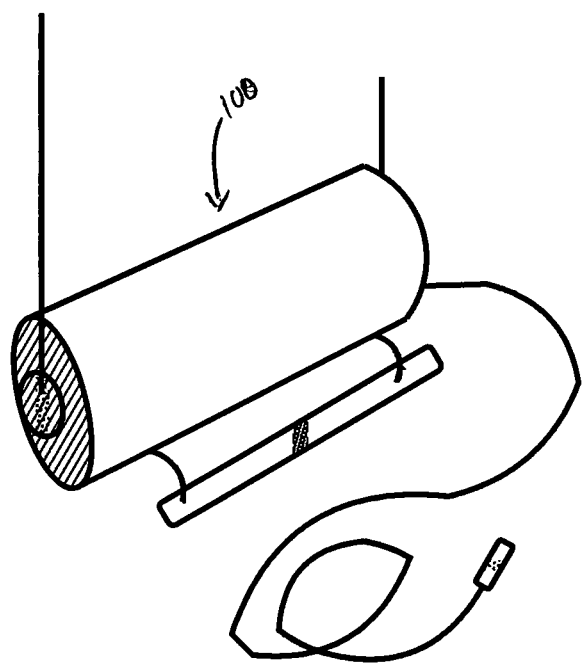
FIG. 4 is a diagrammatic illustration of a RDAR system configured for use as a vehicular repeater in accordance with an example implementation of the present disclosure.

The main problem that can happen with standard vehicular repeaters is that they are almost always hard wired into certain vehicles, and if that particular vehicle needs to leave the area, the communications link goes with it. With the RDAR system 100, the unit simply detaches from one host vehicle and moves to another so it can stay where it is needed. This provides much more flexibility to keep the repeater where it is needed. FIG. 4 shows a RDAR unit 100 configured as a vehicular repeater. A power lead is plugged into a vehicular power outlet such as a cigarette lighter. Antennas are integral to the unit. The unit has a magnetic cradle attached and is placed on a vehicle roof in a horizontal position.

RDAR as a Telephone System Gateway

A RDAR system 100 can be configured to create a phone patch from mobile radios to a cellular, satellite phone, or landline system. With the additions of an auto-interface unit, a mobile or portable radio can access a dial tone over the radio channel by entering a DTMF string. Once the dial tone is established, the desired number can be dialed from the DTMF keypad of the mobile or portable radio. This creates a limited but effective method of accessing a phone line when local cellular service is down.

The RDAR in many cases can access a more distant cellular tower outside the immediate area, due to its elevated position, and the use of a Yagi gain antenna. Also if a land line connection is available, it can create the same type of link into the phone system, with the use of a telephone landline interface 152. See FIG. 13.

Figure 15:
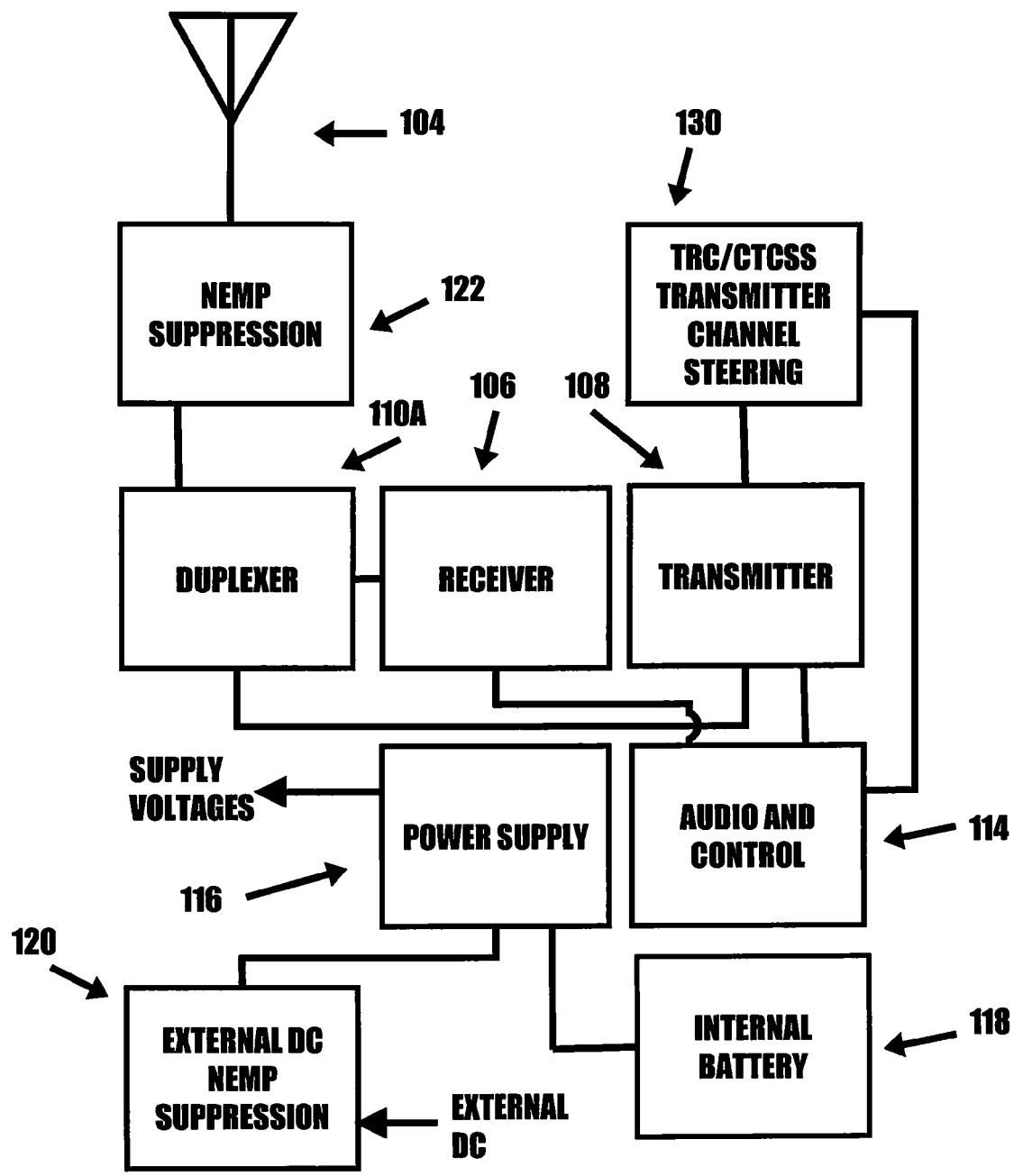
FIG. 15 is a diagrammatic illustration of a block diagram of a RDAR system including provisions for TRC (Tone Remote Control) and/or CTCSS (Continuous Tone-Coded Squelch System) channel steering interface in accordance with an example implementation of the present disclosure.

Steerable CTCSS Tones for Accessing Various Repeater and Paging and Paging Links As shown in FIG. 15, the system 100 includes a TRC/CTCSS Decoding/Radio Channel Steering Device 130. The RDAR platform can also use standard TRC (Tone Remote Control) signaling to channel steer the RDAR transmitted CTCSS (Continuous Tone-Coded Squelch System) tones, and operating frequencies, with the addition of a TRC decoding circuit. This allows shifting the link from one local repeater to another, such as would normally be done with a standard dispatch center control station. This is done with a special transmitter interface that allows TRC channel changes to the transmitter frequency. Thus, different frequencies and CTCSS tones can be selected via incoming TRC signaling. An interface board decodes the TRC signaling and converts the code to channel change inputs to the transmitter by way of a channel control interface. The channel switch bit lines receive the appropriate codes that may cause the transmitter to shift channels. The radios programmed channel list may have whatever frequency and CTCSS combinations that are desired. Channel changes are determined by the selection of the function tone number that is transmitted to the input of the RDAR. (See FIG. 15).

This may be useful if an emergency backup dispatch center is needed. This enhances the ability to send out pages to various fire departments, EMS units, etc. This type of paging would require an external mini-paging terminal that generates standard TRC signaling.

Emergency Communications to the General Public with a Broadcast FM Repeater

Figure 17:
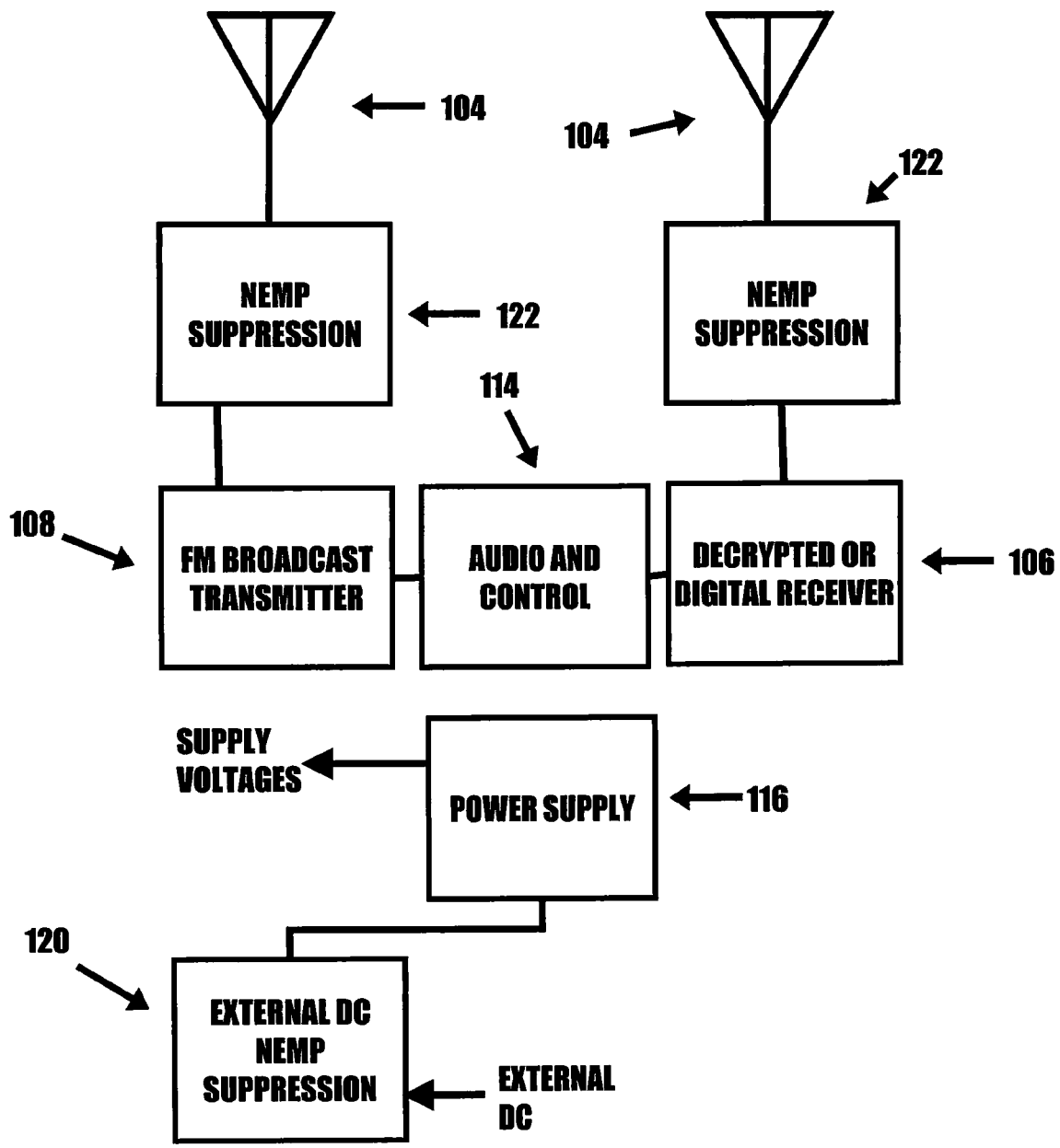
FIG. 17 is a diagrammatic illustration of a block diagram of a RDAR system configured as an frequency modulated (FM) broadcast gateway from a communications receiver to an FM Broadcast band transmitter in accordance with an example implementation of the present disclosure.

In another implementation of the RDAR system 100, the system 100 uses a standard digital or encrypted public safety channel as the input and a 100 watt transmitter on a channel in the FM broadcast band (e.g., a receiver 106 having decryption capability and a frequency modulated (FM) transmitter 108). A suitable antenna is connected to the receiver 106. A second antenna (104) suitable for the desired FM broadcast frequency is connected to the transmitter. The output of the transmitter is configured as a standard FM broadcast signal. This allows emergency officials to remotely make public safety announcements to the general public in the event that all commercial broadcasters are off the air, directly from the local emergency operations center. (See FIG. 17).

Permanent Service Docking Station

The concept of mounting a ruggedized, weatherproof repeater at the same elevation as the tower top antennas can also be used on a permanent basis. Installation of repeaters at tower top level eliminates expensive runs of coaxial cabling, traditionally required to connect ground based repeaters to antennas at height on the tower. Eliminating this cable loss saves vast amounts of energy that are normally required to overcome cable losses. This has a cascade effect of savings, such as reducing infrastructure costs, copper cabling costs, energy operating costs for high power repeaters, and air conditioning the equipment. Cost of the transmitters is reduced as higher power output and receive pre-amplifiers are not needed to overcome cable losses. Backup generator size is greatly reduced or eliminated. No copper cables are in place for vandals to cut and steal.

FIG. 7 shows an example RDAR docking station design. The electronic equipment unit or module resides inside the hollow outer tube of the docking station, which may comprise a vertical, sliding blind mate rack mount.

The equipment module is pulled up from the ground and into the outer case assembly by way of a small winch. The cylindrical equipment module is guided into place with guide pins and rollers in the docking station. The last half inch of travel engages connectors for the externally mounted antenna cable, and for all other electrical connections. The physical size of this type of permanent RDAR may be somewhat larger than the portable version, depending on system requirements.

The permanent docking station configuration can be used for two way radio repeaters, digital or analog. With the proper control circuitry, the tower top docking station may also be used in certain types of trunking systems. It may also be used to enhance efficiency of cellular phone sites by allowing transmitters and receivers to be mounted at tower top level.

AC power is supplied to the docking station to power the battery charger and onboard miniature Peltier cooling/heating system. In the event that AC power fails, the station can operate on internal battery power from a few hours to several days, depending on battery size and the transmitter power output of the repeater. Circuitry can be incorporated to automatically reduce transmitter power in the event of the loss of external AC power, so as to maximize the operating time of the unit on battery power.

The winch system can lower and raise equipment modules from ground level to tower top. Seating, engagement, and dis-engagement of the equipment modules from the docking station are automatic. This allows non-technical personnel to install and remove the equipment module from ground level.

An equipment module can be lowered to ground level and a spare unit put in its place and it can be re-installed in minutes.

The outer case of the docking station is designed to be bullet resistant, so as to minimize the potential for vandalism.

FIG. 8 shows a system architecture as is used in the portable RDAR system 100. A larger battery (i.e., battery having a greater amount of capacity to power the system 100) may be employed externally or auxiliary power source(s), such as solar panels may be employed to extend the operating time of the unit. EMP/EMI shielding is of course present, as in all models.

Power may be supplied via a twelve (12) volt storage battery. One version has an externally rechargeable battery; the other can use standard "D" cells, which at low power can last for two to three days or more.

Power output of the RDAR can be equipped to produce anywhere from one watt to one hundred (100) watts, or more, depending on the requirements of the application. The power supply requirements vary according to the power consumption of the individual unit.

Higher power units require an external power source, such as AC power from the grid, or a portable generator. High power units may also be supplied using a connection to a 12 volt vehicle battery in an emergency. RDAR units may also have battery charging supplemented with, or completely powered with solar panels and battery combinations.

As described above, the system 100 may utilize a composite vault built with an integrated Faraday Cage. The antenna and power leads may pass through NEMP suppression devices. This is preemptive protection against solar or nuclear generated EMP events, as well as lightning.

The internal frame of the RDAR may be mounted on shock mounts to protect the electronics from mechanical shock loads, from rough handling, etc.

The vault may be waterproof for low to medium power units. External cooling tubes are used as heat exchangers. Cooling tubes may incorporate forced internal air to augment cooling, when used with external power, depending on the transmit power level used. High power units may require direct forced ventilation of external air.

Variations on the architecture of the unit include an in-band repeater, cross band/gateway repeater, hybrid repeater (in band repeater coupled to a trunking system), cellular telephone interface, satellite telephone interface, simplex/multi-simplex repeater, and multiple channel linked repeater. The multiple channel unit is capable of connecting or patching two or more communications channels with the use of selectable links. Patching selection can be done via over the air tone control.

The RDAR can be configured to support P25 digital systems or any digital voice mode currently in use. It can pass in band signaling protocols such as FleetSync, MDC-1200, etc. It may employ Motorola MotoTRBO radio equipment to provide compatibility with MotoTRBO mobile and portable radios.

Simplex/Multi-Simplex Repeater Array

Figure 16:
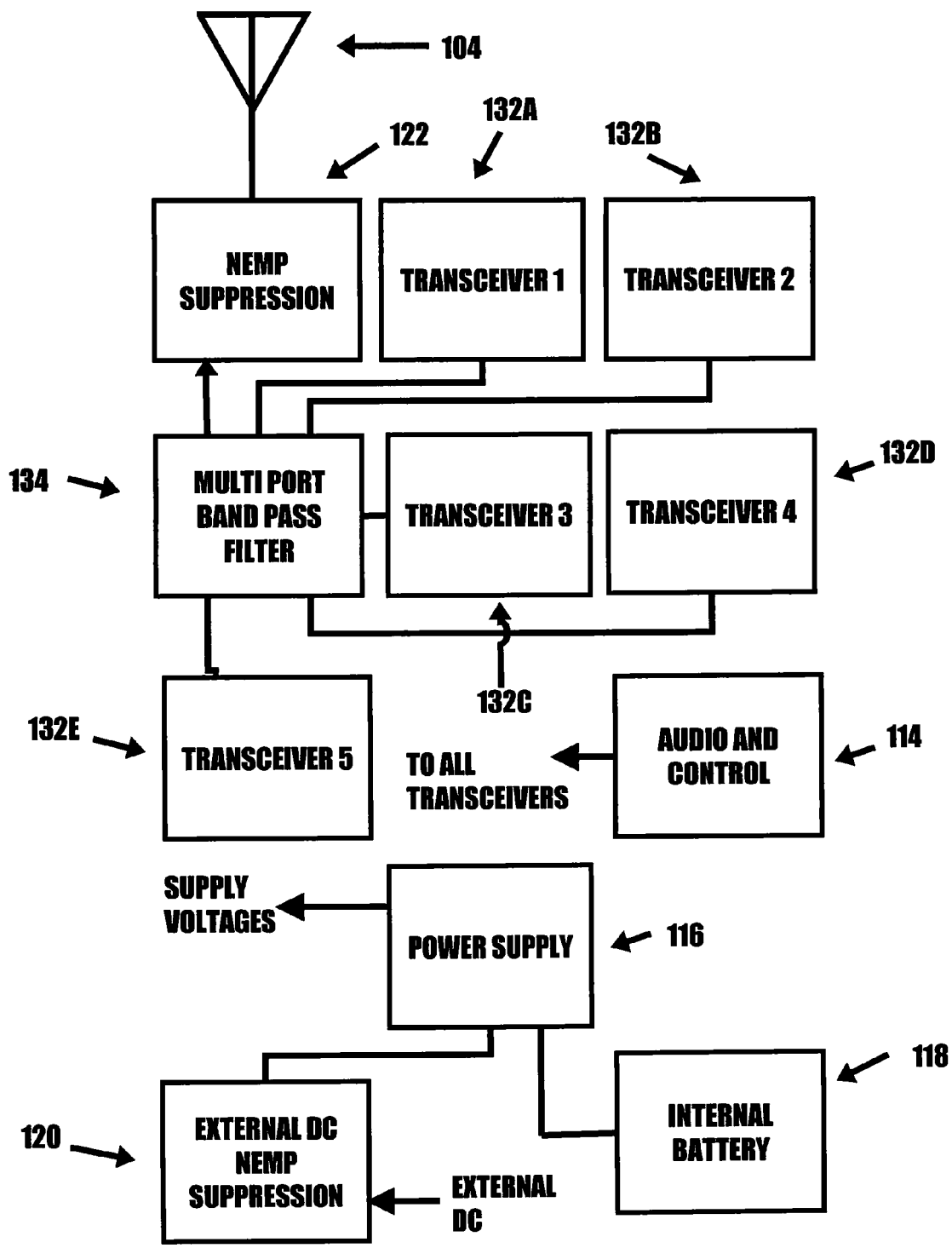
FIG. 16 is a diagrammatic illustration of a block diagram of a RDAR system configured as a five (5) channel simplex repeater in accordance with an example implementation of the present disclosure.

As shown in FIG. 16, the system 100 includes multiple transceivers 132A, 132B, 132C, 132D, 132E communicatively connected to one or more bandpass filters 134. The bandpass filter 134 is configured to pass frequencies occurring in one band of frequencies and to reject frequencies occurring outside the one or more range of frequencies. For example, a first bandpass filter 134 is configured to pass a signal occurring in a first frequency furnished by the first transceiver 132A, a second bandpass filter 134 is configured to pass a signal occurring in a second frequency furnished by the first transceiver 132B, a third bandpass filter 134 is configured to pass a signal occurring in a third frequency furnished by the third transceiver 132C, and so forth. A simplex repeater array with an antenna combiner can restore communications to multiple channels at once. Simplex repeaters use one frequency instead of two, and the input voice message is simply recorded and repeated on the working channel. This is a slower method of communications than a full duplex repeater, however, it is a rapid method of restoring multiple channels quickly. A multi-simplex repeater can support several simplex repeaters (e.g., transceivers 132A, 132B, 132C, 132D, 132E) in one unit. With proper filtering (e.g., via the bandpass filter 134) of each transceiver, one antenna can be used for several channels Impedance matching circuitry may be employed for proper signal transfer to the common antenna. (See FIG. 16).

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A portable repeater system comprising:
an electromagnetic pulse (EMP) suppression device;
an antenna directly coupled to the electromagnetic pulse (EMP) suppression device, the antenna for receiving and for transmitting analog voice communication data;
at least one receiver;
at least one transmitter;
a communication isolator communicatively coupled to the at least one transmitter and to the at least one receiver, the communication isolator configured to communicatively isolate the at least one transmitter from the at least one receiver to allow the at least one transmitter and the at least one receiver to utilize the antenna, the communication isolator directly coupled to the electromagnetic pulse (EMP) suppression device; and
a vault completely enclosing the at least one transmitter, the at least one receiver, and the communication isolator, the vault having an integrated electromagnetic shielding, wherein the portable repeater system is configured to be deployed at a same height as the antenna to at least substantially eliminate antenna transmission line signal losses.

2. The portable repeater system as recited in claim 1, wherein the communication isolator comprises at least one of a duplexer or a triplexer.

3. The portable repeater system as recited in claim 1, further comprising a portable power supply configured to power the at least one transmitter, the at least one receiver, the control circuitry, the portable power supply enclosed within the vault.

4. The portable repeater system as recited in claim 1, wherein the vault is comprised of a copper foil or mesh integrated into the vault walls to create a Faraday cage to at least substantially prevent electromagnetic energy entering into the vault.

5. The portable repeater system as recited in claim 1, further comprising a direct current (DC) supply electromagnetic pulse (EMP) suppression device and an alternating current (AC) supply electromagnetic pulse (EMP) suppression device.

6. A portable repeater system comprising:
an electromagnetic pulse (EMP) suppression device;
an antenna directly coupled to the electromagnetic pulse (EMP) suppression device, the antenna for receiving and for transmitting analog voice communication data;
a first transceiver;
a second transceiver;
a communication isolator communicatively coupled to the first transceiver and the second transceiver, the communication isolator configured to communicatively isolate the first transceiver from the second transceiver to allow the first transceiver and the second transceiver to utilize the antenna, the communication isolator directly coupled to the electromagnetic pulse (EMP) suppression device; and
a vault completely enclosing the first transceiver, the second transceiver, and the communication isolator, the vault having an integrated electromagnetic shielding, wherein the portable repeater system is configured to be deployed at a same height as the antenna to at least substantially eliminate antenna transmission line signal losses.

7. The portable repeater system as recited in claim 6, wherein the communication isolator comprises at least one of a duplexer or a triplexer.

8. The portable repeater system as recited in claim 6, further comprising a portable power supply configured to power the first transceiver, and the second transceiver, the portable power supply enclosed within the vault.

9. The portable repeater system as recited in claim 6, wherein the vault is comprised of a copper foil or mesh integrated into the vault to create a Faraday cage to at least substantially prevent electromagnetic energy entering into the vault.

10. The portable repeater system as recited in claim 6, further comprising a direct current (DC) supply electromagnetic pulse (EMP) suppression device and an alternating current (AC) supply electromagnetic pulse (EMP) suppression device.

11. A portable repeater system comprising:
an electromagnetic pulse (EMP) suppression device;
an antenna directly coupled to the electromagnetic pulse (EMP) suppression device, the antenna for receiving and for transmitting analog voice communication data;
at least one receiver;
at least one transmitter;
a communication isolator communicatively coupled to the at least one transmitter and to the at least one receiver, the communication isolator configured to communicatively isolate the at least one transmitter from the at least one receiver to allow the at least one transmitter and the at least one receiver to utilize the antenna, the communication isolator directly coupled to the electromagnetic pulse (EMP) suppression device;
a vault completely enclosing the at least one transmitter, the at least one receiver, and the communication isolator, the vault having an integrated electromagnetic shielding, wherein the portable repeater system is configured to be deployed at a same height as the antenna to at least substantially eliminate antenna transmission line signal losses; and
a DTMF decoding switching device configured to receive one or more signals to control operation of a remote device.

12. The portable repeater system as recited in claim 11, wherein the communication isolator comprises at least one of a duplexer or a triplexer.

13. The portable repeater system as recited in claim 11, further comprising a portable power supply configured to power the at least one transmitter, the at least one receiver, and the at least one communication isolator, the portable power supply enclosed within the vault.

14. The portable repeater system as recited in claim 11, further comprising a direct current (DC) supply electromagnetic pulse (EMP) suppression device and an alternating current (AC) supply electromagnetic pulse (EMP) suppression device.

* * * * *